United States Patent

Massiera et al.

(10) Patent No.: US 7,990,913 B2
(45) Date of Patent: Aug. 2, 2011

(54) MOBILITY MANAGER

(75) Inventors: Annelise Massiera, Fontenay-aux-Roses (FR); Bastien Murzeau, Barnet (GB); Sébastien Auvray, Issy-les-Moulineaux (FR); Stéphane Atheo, Heric (FR)

(73) Assignee: France Telecom, Paris (FR)

(*) Notice: Subject to any disclaimer, the term of this patent is extended or adjusted under 35 U.S.C. 154(b) by 644 days.

(21) Appl. No.: 11/908,097

(22) PCT Filed: Mar. 2, 2006

(86) PCT No.: PCT/EP2006/002071
§ 371 (c)(1), (2), (4) Date: Sep. 7, 2007

(87) PCT Pub. No.: WO2006/094757
PCT Pub. Date: Sep. 14, 2006

(65) Prior Publication Data
US 2008/0259852 A1 Oct. 23, 2008

(30) Foreign Application Priority Data
Mar. 7, 2005 (EP) .................................... 05290505

(51) Int. Cl.
H04W 4/00 (2009.01)
(52) U.S. Cl. ........................................ 370/328; 370/465
(58) Field of Classification Search .................. 370/328, 370/465, 252; 709/227; 455/432.1, 453, 455/452.2
See application file for complete search history.

(56) References Cited

U.S. PATENT DOCUMENTS

| 5,729,531 | A | 3/1998 | Raith et al. |
| 7,171,215 | B2 | 1/2007 | Khouaja et al. |
| 7,496,066 | B2 * | 2/2009 | Speltacker et al. ............ 370/328 |
| 7,539,499 | B2 * | 5/2009 | Holur et al. ................ 455/452.2 |
| 2002/0133589 | A1 | 9/2002 | Gubbi et al. |

FOREIGN PATENT DOCUMENTS

| EP | 1435748 A1 | 7/2004 |
| EP | 04292921.6 A1 | 6/2006 |
| WO | 03047296 A1 | 6/2003 |
| WO | 2004017395 A1 | 2/2004 |
| WO | 2004036845 A1 | 4/2004 |

* cited by examiner

*Primary Examiner* — Ricky Ngo
*Assistant Examiner* — Chandrahas Patel
(74) *Attorney, Agent, or Firm* — Thome & Halajian, LLP; Gregory L. Thorne

(57) ABSTRACT

A mobility manager provides mobility management of mobile nodes in accordance with bandwidth allocated from an access point. The mobility manager receives traffic shaping report messages from a traffic shaper within an access network of which the access point forms part, the traffic shaping report messages reporting on a current use of bandwidth for each of a plurality of different traffic types by one or more non mobility-managed mobile nodes which are not controlled by the mobility manager, and reporting on bandwidth used by one or more of the mobility-managed mobile nodes, which are managed by the mobility manager. The traffic pattern is adapted in accordance with a current use of bandwidth for the different traffic types by the non mobility-managed mobile node and is communicated to the traffic shaper for use in controlling the bandwidth of the access point in accordance with the adapted traffic pattern.

16 Claims, 15 Drawing Sheets

Enhanced architecture with traffic shaping

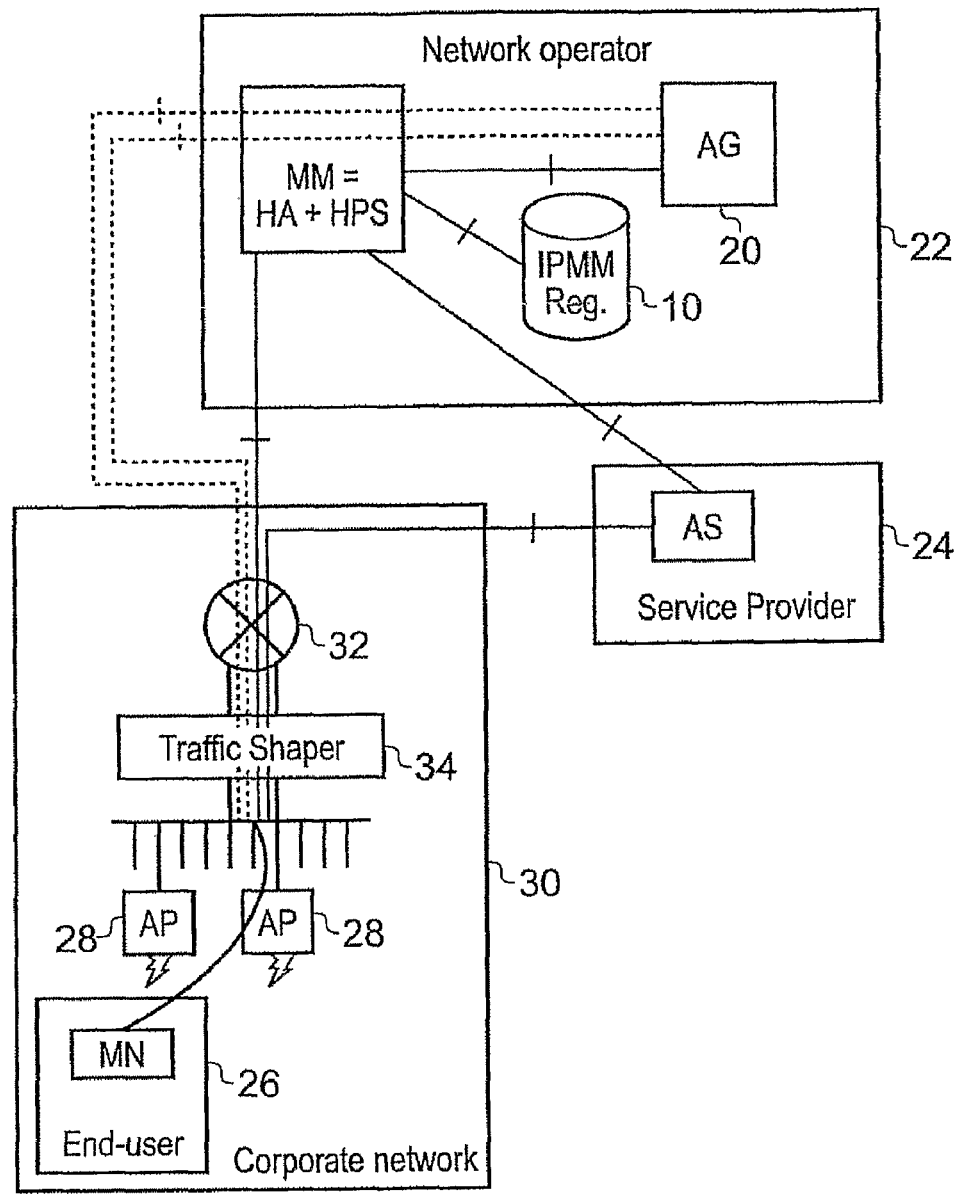
Fig. 2: Enhanced architecture with traffic shaping

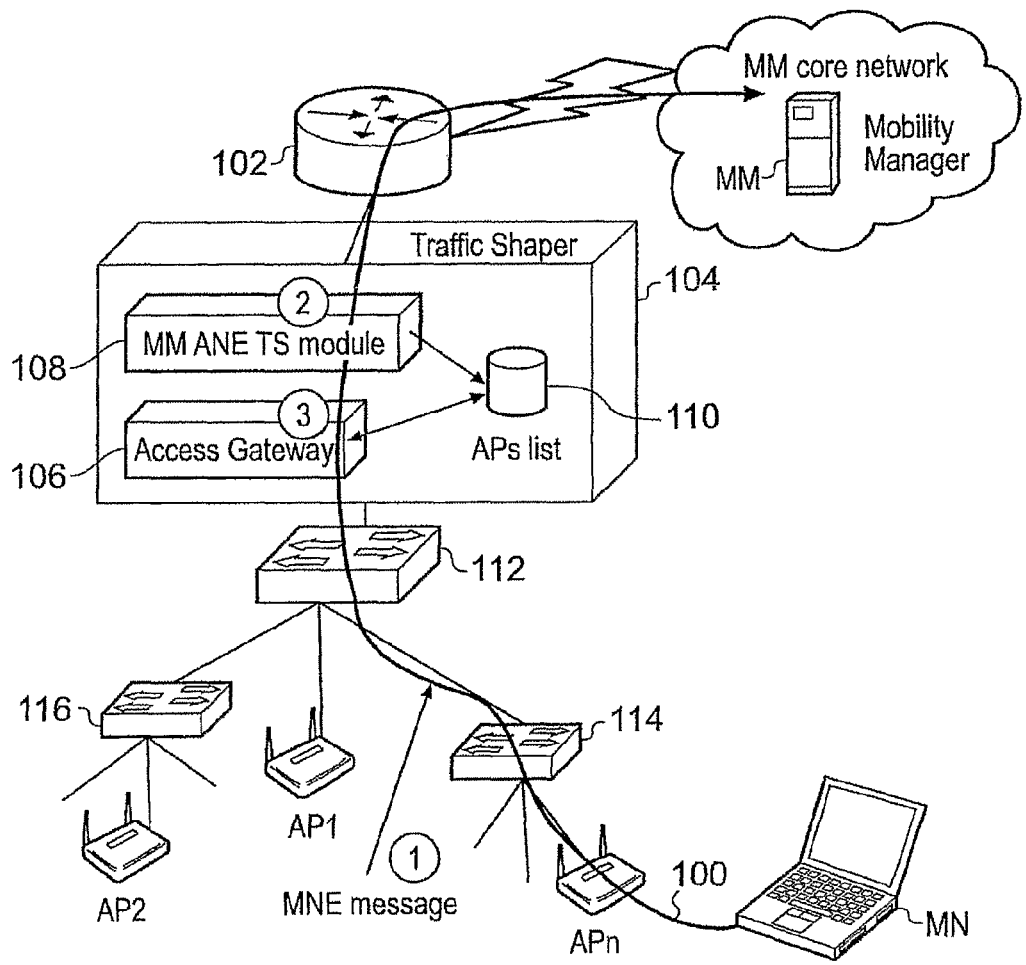
Fig. 3: Discovery of Access Points
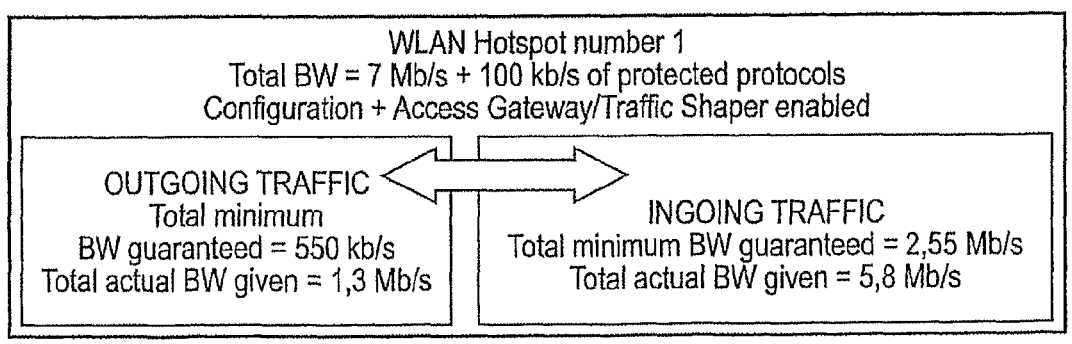
Fig. 4: Global Pattern

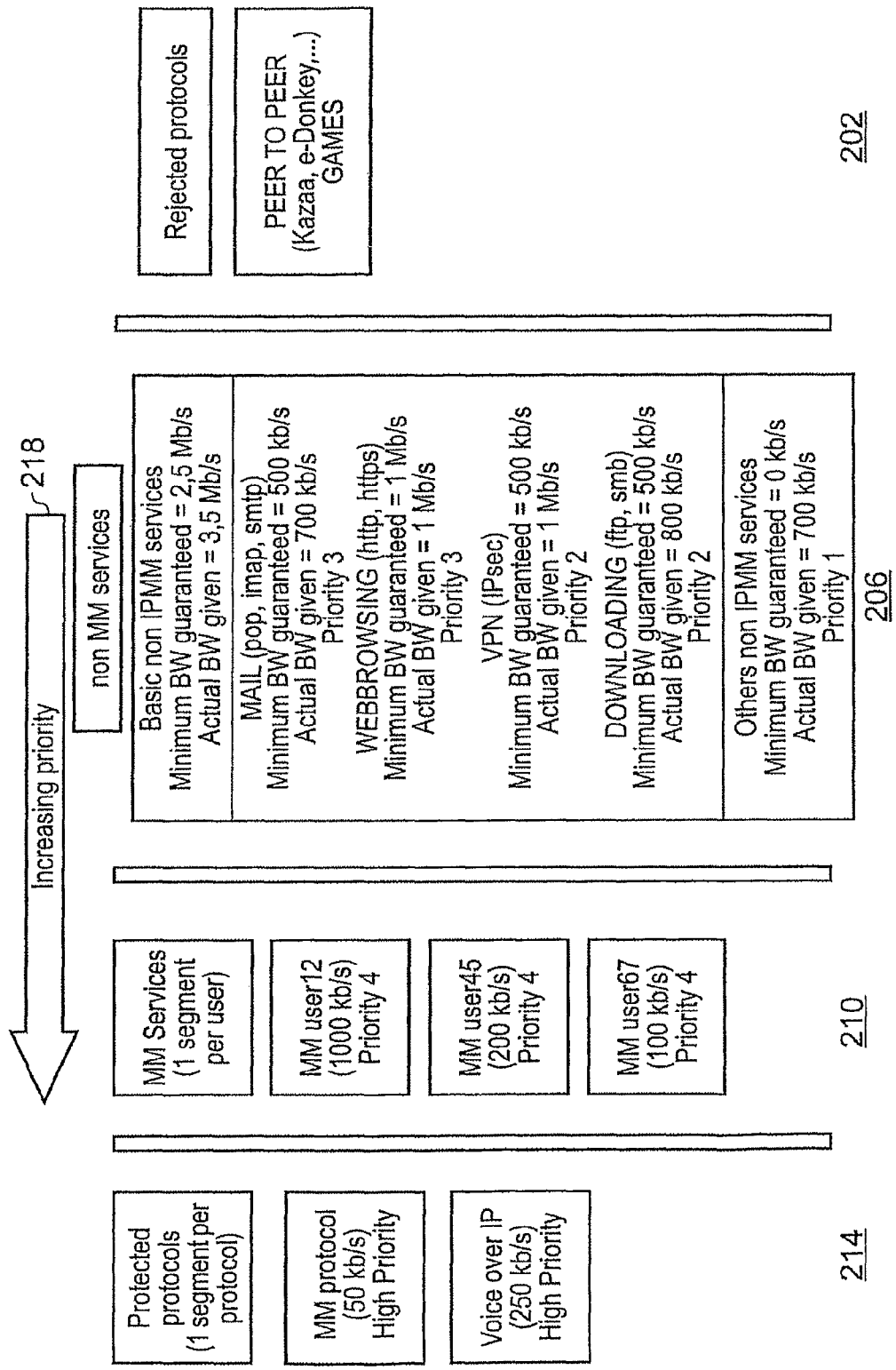
Fig. 5: Ingoing traffic pattern

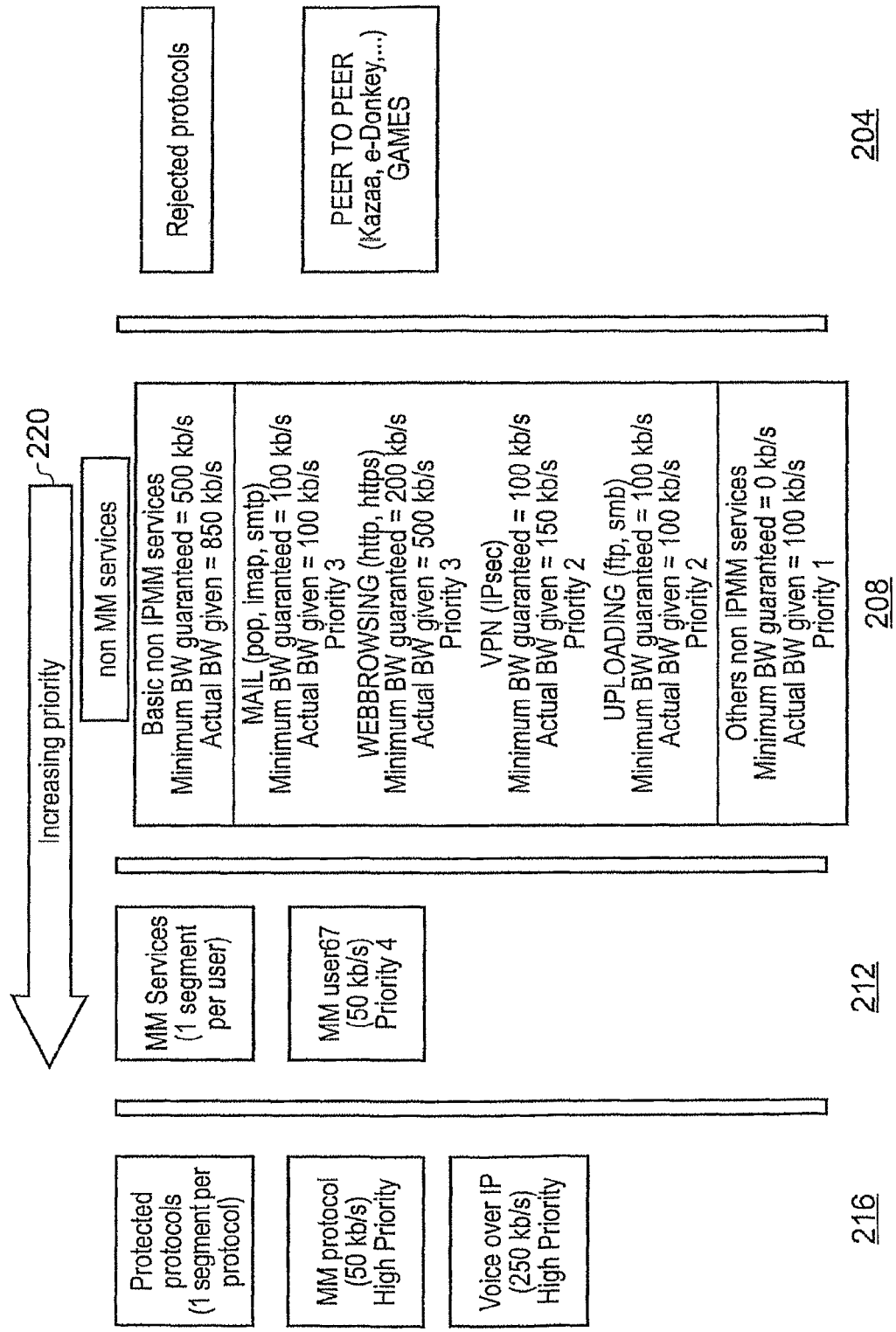
Fig. 6: Outgoing traffic pattern

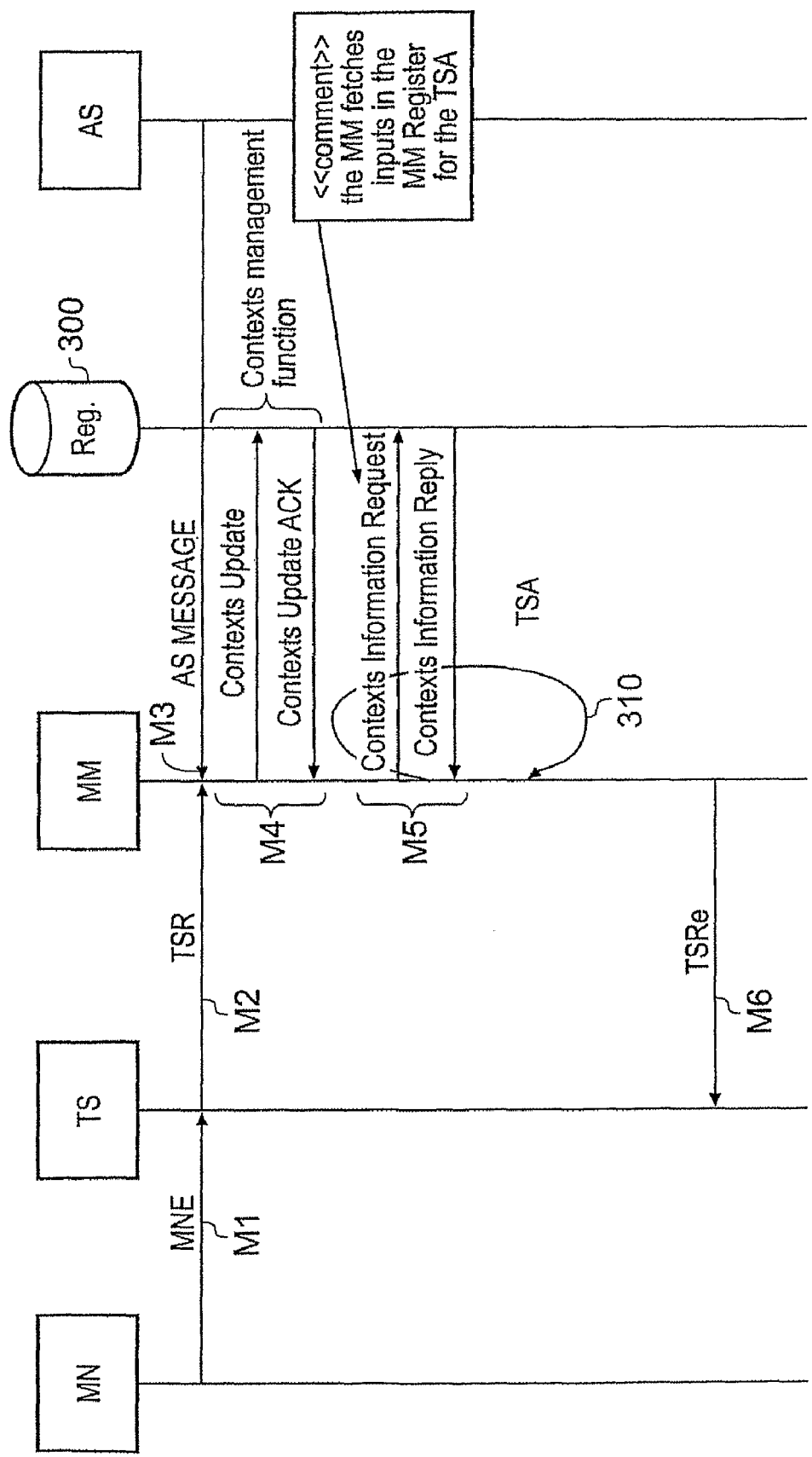
Fig. 7: MMTS protocol

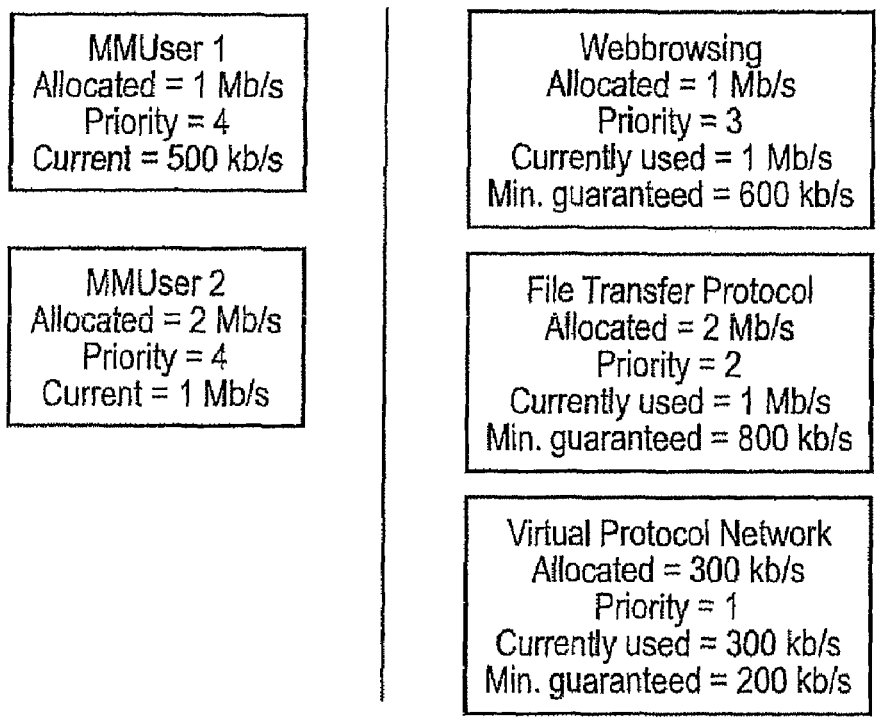
Fig. 9(a): Before Traffic Pattern Adapted
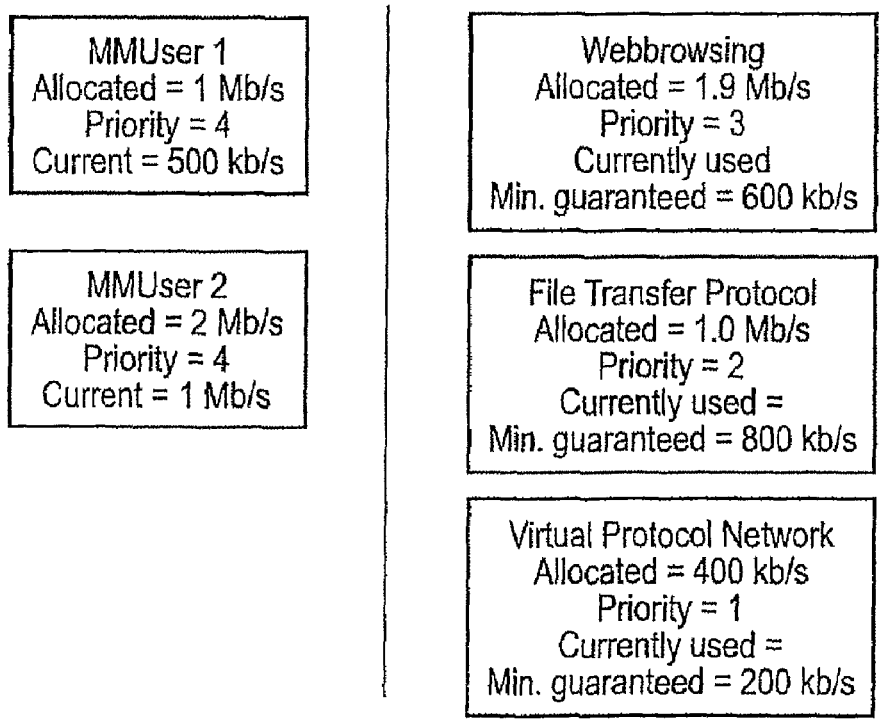
Fig. 9(b): After Traffic Pattern Adapted

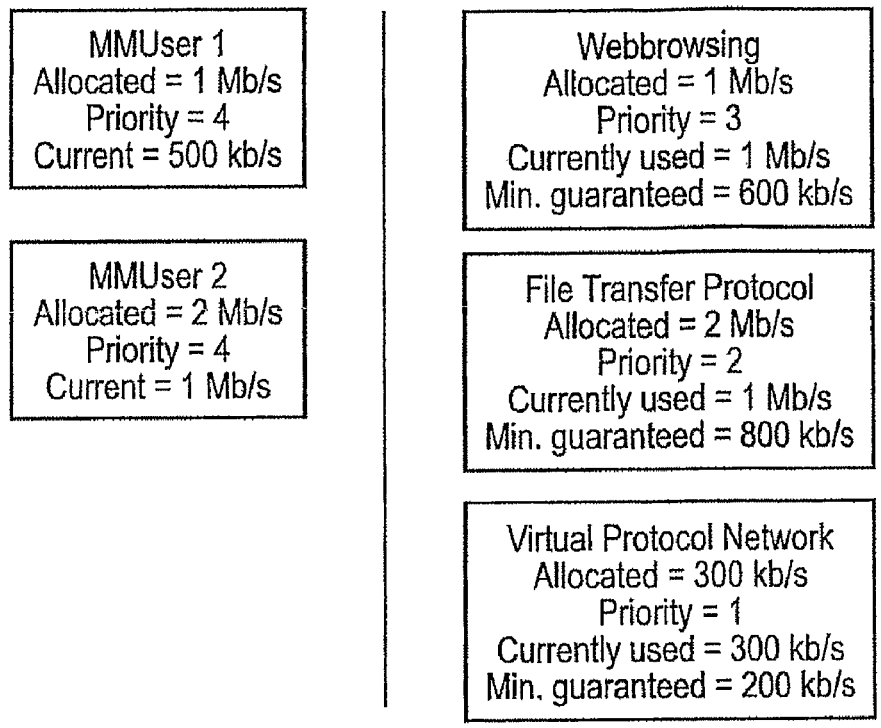
Fig. 16(a): Before Traffic Pattern Adapted
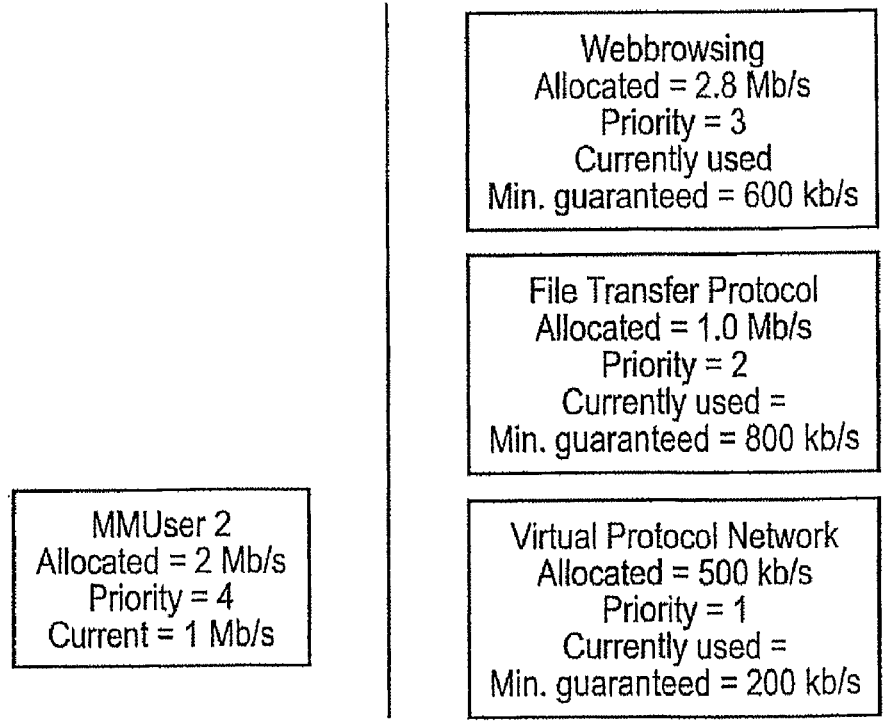
Fig. 16(b): After Traffic Pattern Adapted

MOBILITY MANAGER

FIELD OF THE INVENTION

The present invention relates to telecommunications systems and methods and to a mobility manager operable within a telecommunications system to provide mobile internet protocol related services to mobile nodes via a plurality of access networks.

BACKGROUND OF THE INVENTION

There are various types of mobile radio networks with which mobile related services can be provided to mobile nodes. For example, Global System for Mobiles (GSM) networks provides a facility for data and voice communications via fixed capacity radio communications channels. The Universal Mobile Telecommunications System (UMTS) on the other hand provides improved flexibility in affording greater data rates to mobile nodes whilst still providing a facility for mobile communications made possible by a cellular architecture. On the other hand the Wireless Local Area Networks (WLAN) standards for example IEEE 802.11B referred to as WIFI provide a facility for high data rate communications within so called WLAN hotspots. Such WLANs provide a substantially greater data rate than can be provided through cellular mobile radio architectures such as GPRS and UMTS. Furthermore, WLANs are often unregulated in that a single mobile node can occupy a greater proportion of the available data communications bandwidth than another mobile node.

Many applications utilize an internet protocol to support data communication such as for example multi-media services. As such, a communications service may be provided by communicating internet protocol packets via a variety of different networks. The application may not be aware of the type of network via which the internet protocol packets are being communicated. Thus, in the case of wireless communications the application may communicate internet packets via GPRS or WLAN networks. However, since these different types of mobile radio networks offer substantially different communications bandwidths, a quality of service which can be supported will be different in accordance with the communications bandwidth provided by the mobile access network. As such, a communications service may be provided using different communications session levels, each level providing a different quality of service as determined by the access network via which the mobile node is currently communicating. For each communications session level, different types of media may be communicated. Thus for example, for one communications session level video may be supported, whereas another level may only support audio.

European patent EP 1 435 748 discloses a telecommunications system in which a mobility manager is arranged to control a communications session provided to a mobile node in accordance with an access network which the mobile node is currently communicating internet data packets. An applications server provides a communications service to the mobile nodes. The mobility manager in combination with the applications server negotiate a change in a communications session level within the service which is provided to the mobile node in accordance with a change in communications bandwidth associated with a change of affiliation from one access network to another access network. In accordance with a relative change in the communications bandwidth available between the first mobile network and the second mobile network, a change in the quality of service provided via the communications session may be affected thereby maintaining a level of service to which a user has subscribed.

International patent application WO 03/047296 discloses an arrangement in which messages which form part of a mobile IPV6 internet protocol are extended to provide a facility for a mobile node and a mobility manager to communicate link quality related messages. In particular, the mobile node is disclosed as sending a request for a handover only when the link quality on its current communications mobile access network is decreasing, so that, seamless mobility is achieved but no quality of service is enabled.

International patent application WO 04/017395 discloses a traffic shaper which is operable to control an amount of bandwidth available from an access point, which is used by different traffic types and protocols.

SUMMARY OF INVENTION

According to the present invention, there is provided a mobility manager for providing mobility management of mobile nodes, which have subscribed to an applications server for a communications service. The applications server is arranged to control a level of a communications session provided within the communications service in accordance with bandwidth allocated to the applications server for the mobility-managed mobile nodes by the mobility manager from an access point to which the mobility-managed mobile nodes are attached. The mobility manager receives traffic shaping report messages from a traffic shaper within an access network of which the access point forms part. The traffic shaping reports on a current use of bandwidth, for each of a plurality of different traffic types, by one or more non mobility-managed mobile nodes, which are not controlled by the mobility manager. The traffic shaping report messages also report on bandwidth used by one or more of the mobility-managed mobile nodes, which are managed by the mobility manager. The mobility manager is operable, in response to the traffic shaping reports, to adapt the traffic pattern in accordance with the current use of bandwidth of the different traffic types by the non mobility-managed mobile node, and to communicate the adapted traffic pattern to the traffic shaper for use in controlling the bandwidth of the access point in accordance with the adapted traffic pattern.

The mobility manager is therefore able to control an amount of bandwidth used by mobile nodes, which are not controlled by the mobility manager, which will be referred to as non mobility-managed mobile nodes. A bandwidth available to the access network is divided between each of a plurality of different traffic types for non mobility-managed mobile nodes and between mobility managed mobile nodes, which are currently attached to the access point. The mobility-managed mobile nodes receive bandwidth allocations from the mobility manager through requests from an applications server. The non mobility-managed mobile nodes which have not subscribed to the mobility manager and are using different services such as e-mail or web-browsing are controlled by the traffic shaper to the effect that an amount of bandwidth, which can be used on the access point is controlled in accordance with an allocation provided by the traffic pattern. Hence the bandwidths for these mobile nodes which have not subscribed to the mobility manager MM are controlled from the different traffic types by the traffic shaper.

The mobility manager controls the bandwidth allocated to the non mobility-managed mobile nodes, to the effect that these mobile nodes do not consume a disproportionate amount of the bandwidth available from the access point. As a result mobile nodes, which are receiving a communications service from an applications server for which the mobility manager is allocating bandwidth and controlling handover, are able to receive a fairer share of the bandwidth available from the access point. Mobile nodes which are receiving a communications service from an applications server for which a bandwidth allocation is controlled by the mobility manager will be referred to as mobility-managed mobile nodes.

As explained above a mobility manager can provide mobile internet protocol related communications services to mobile nodes via a plurality of access networks. However, a mobility manager according to the present invention seeks to address a perceived technical problem with a previously proposed arrangement of a telecommunications system with a mobility manager. The mobility manager disclosed in co-pending European patent applications number 04292921.6, provides a facility for maintaining a highest communications session level, whilst controlling inter-network handover, in combination with congestion control. The congestion control and the inter-network handover are prioritised in accordance with a level of service to which the mobile nodes have subscribed. However, the service level subscription based congestion control and handover management is only provided to mobile nodes which are using communications services from applications servers, which have subscribed to the mobility manager for controlling this handover and congestion control.

Services provided by other applications such as e-mail or web browsing are not taken into consideration, because such services are not provided by an applications server which has subscribed to a mobility manager. As a result such services can consume a disproportionate amount of the bandwidth available from an access point to the detriment of mobile nodes which are being provided with a communications session from an applications server which has subscribed to a mobility manager. To this end, embodiments of the present invention can provide a telecommunications system in which an access network is provided with a traffic shaper for controlling an amount of bandwidth consumed by each of a plurality of different traffic types as well as mobile nodes which are attached to one or more access points of the access network. The traffic shaper is arranged to control an amount of bandwidth consumed by non-mobility-managed mobile nodes according to each of a plurality of different traffic types and by mobility-managed mobile nodes attached to the access point in accordance with a traffic pattern. The traffic pattern specifies an amount of bandwidth which has been allocated to each of the different traffic types for the non mobility-managed mobile nodes and the mobility-managed mobile nodes. By adapting the traffic pattern in accordance with a priority for each different traffic type and the mobile nodes in a combination with a demand for bandwidth either for the traffic types or on request from the applications server to provide bandwidth to the mobile nodes, a relative balance in use of the available bandwidth can be effected. As such a likelihood of any one traffic type being consumed by a non-mobility managed mobile node in a way which is disproportionate to an amount of the available bandwidth to the detriment of other mobility-managed mobile nodes is reduced. Accordingly an enhanced mobility manager concept is proposed with dynamic traffic-shaping. The IEEE 802.11 WLAN provides an example of an unregulated radio access network, in that the spectrum is unregulated and free-for-all, in contrast to cellular systems such as GSM, GPRS or UMTS where mobile nodes are assigned resources by the network. An unfortunate consequence is that the traffic of only one mobile node can affect all the performances of all other mobile nodes. For example one of the mobile nodes receiving an UDP video streaming and being at the frontier of the WLAN hotspot coverage can consume a substantial quantity of the available communications bandwidth. As a result of the quality link degradation, the throughput of the hotspot can decrease down to zero.

Embodiments of the present invention can provide a mobility manager in which:

Control of a QoS served to all types of applications can be provided and a minimum level guaranteed, linked or not to Applications server, for MM clients.

Control of the bandwidth shared between MM clients and non-MM clients can be provided.

An accurate distribution of the users on the different access networks can be effected in accordance with an operator's policy.

Embodiments of the present invention utilise:

An enhanced architecture of a telecommunications system which utilises traffic shapers Messages sent by the traffic shapers to the mobility manager which are called "Traffic Shaping Request" (TSR) and actions launched by this message Messages sent by the Mobility Manager to the traffic shapers which are called "Traffic Shaping Reply" (TSRe) and actions launched by this message A traffic shaping algorithm performed by the mobility manager to take decisions on TSR messages.

Various further aspects and features of the present invention are defined in the appended claims and include a mobility manager and a method of providing mobile internet protocol related communications services to mobile nodes via a plurality of access networks.

BRIEF DESCRIPTION OF THE DRAWINGS

Embodiments of the present invention will now be described by way of example only with reference to the accompanying drawings, where like parts are provided with corresponding reference alpha-numeric numerals, and in which:

FIG. 2 is a schematic block diagram of parts of the telecommunications system shown in FIG. 1 to illustrated the parts associated with the operation of the mobility manager;

FIG. 3 is a schematic block diagram showing in more detail the parts of the telecommunications system shown in FIG. 2;

FIG. 4 is an illustrative representation of a global traffic pattern identifying an amount of bandwidth which is available from an access point for in going and out going traffic;

FIG. 5 is an illustrative representation of a traffic pattern for the in going traffic for the access point corresponding to the global traffic pattern shown in FIG. 4;

FIG. 6 is an illustrative representation of a traffic pattern for the out going traffic for the access point corresponding to the global traffic pattern shown in FIG. 4;

FIG. 7 is a schematic representation of a message flow and process steps performed to provide the mobility manager shown in FIGS. 1, 2 and 3 with information pertaining to a current use of bandwidth from the access point;

FIG. 9a provides an example of a traffic pattern before adaptation by the mobility manager, whereas FIG. 9b provides the traffic pattern after adaptation by the mobility manager;

FIG. 16a provides an example of a traffic pattern before adaptation by the mobility manager where the mobility manager is re-allocating bandwidth between a plurality of different traffic types when a communications session provided by the applications server to a mobility-managed mobile node has closed, whereas FIG. 16b provides the traffic pattern after adaptation by the mobility manager.

DESCRIPTION OF EXAMPLE EMBODIMENTS

Figure 1:
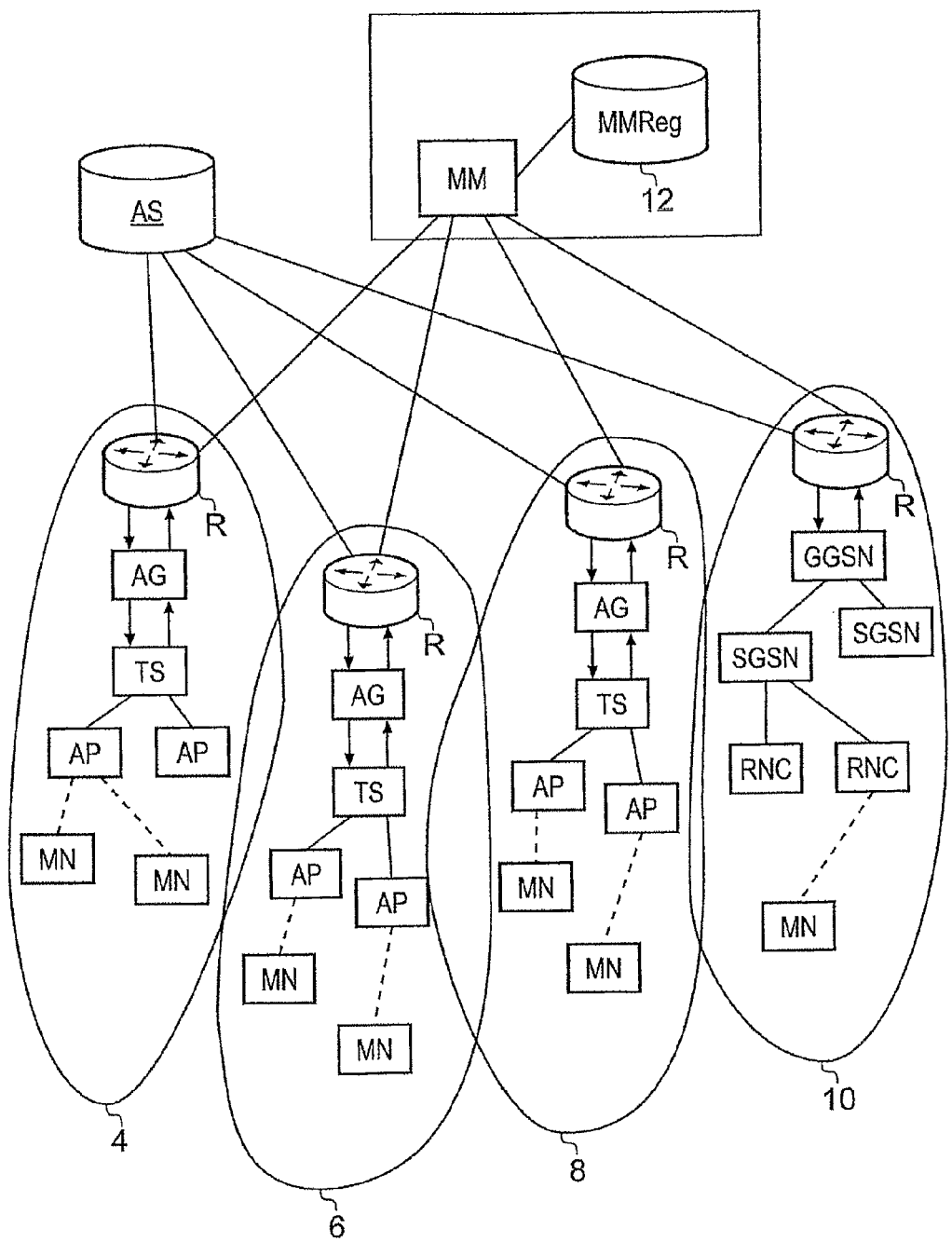
FIG. 1 is a schematic block diagram of a telecommunications system in which mobile nodes are provided with internet protocol communications services using a plurality of access networks by an applications server, the mobility being controlled by a mobility manager.

A general system architecture for elements forming an embodiment of the present invention is illustrated in FIG. 1. In FIG. 1 an applications server AS is arranged to execute an applications layer program for providing, for example, a multi-media communications service to mobile nodes MN. Although the applications server AS is providing the multi-media communications session, a communications link via which the service is provided utilises an internet protocol which is supported over a communications channel which may be effected via a number of different mobile communications access networks 4, 6, 8, 10. As will be explained shortly a service level may vary according to the type of access network via which the mobile node is communicating, because a communications bandwidth, which can be provided by the access network, will be different in accordance with the types of the access network. The bandwidth may also vary for a mobile node, which is attached to an access network, in accordance with an amount of congestion on the network and/or a variation in radio reception/transmission conditions. A mobility manager MM is provided in order to control the communications session and more particularly the handover of the mobile node from one access network to another.

As explained in European Patent applications 04292921.6, the mobility manager MM controls the handover and congestion of the access networks 4, 6, 8, 10 in dependence upon user profile information. The user profile information is provided by a mobility manager register 12, which may include an indication of a service quality level to which a user of the mobile node MN has subscribed.

In FIG. 1 for each of the access networks 4, 6, 8 an access gateway AG is provided through which all inbound and outbound internet packets are communicated to and from the mobile nodes MN. The access gateways AG are also associated with one or more access points AP with which the mobile nodes MN are affiliated. For each access point AP there is provided an amount of communications bandwidth, the amount varying according to the type of radio access interface with which radio communications with the mobile node is effected. Thus, for the first and second access networks 4, 6 two access points AP are provided whereas for the third access network and the single access point AP is provided. The mobile nodes MN may handover between access points within an access network (intra network handover) or may handover from one access point on one access network and another access point on one of the other access networks (inter network handover) thanks to a traffic shaper mating 4, 6, 8. An intra-network handover is not controlled by the mobility manager, but by the network itself, although a session level may change in accordance with a change of link quality. In one example, the first and second access networks 4, 6 may be WLANs operating in accordance with IEEE802.11b, whereas the third access network 8 may be a GSM network.

In order to control a change of affiliation of mobile nodes (handover) between the different access networks 4, 6, 8, 10 in accordance with a current loading on the access networks, the mobility manager MM receives access network evaluation messages (ANEag) from access gateways AG. The mobile nodes also communicate Mobile Node Evaluation (MNE) messages reporting on a currently experienced like quality, so that the mobility manager can control handover to provide the algorithm application in accordance with the operator policy. The mobility manager adapts the bandwidth allocated to the mobile nodes, in accordance with a service level to which the mobile nodes have subscribed and an amount of congestion on the access point, to provide a highest communications session level, which is available. The operation of the mobility manager to perform controlled handover and network de-congestion is described in more detail in European patent application 04292921.6.

The inbound and outbound internet packets which are routed from the access gateway to the mobile nodes via the access points AP with which the mobile nodes MN are attached also pass through and are analysed by a traffic shaper TS. As will be explained shortly in accordance with the present technique a traffic shaper TS is provided to each access network after the first router R. Routers R are provided to the access networks to allow internet packets to be communicated between different parts of the network according to an internet protocol (for example IPv4, IPv6). The first router R is therefore the first of the routers via which internet packets are received from or sent to an external network and is therefore provided for routing internet packets into and out of the access network. The router R is therefore associated with the access gateway AG. As will be explained shortly, the telecommunications system shown in FIG. 1 is arranged to control an amount of bandwidth used by mobile nodes MN. This is not only for those mobility-managed mobile nodes, whose bandwidth use is controlled by the mobility manager MM, but also those non mobility-managed mobile nodes, which are not receiving a communications service from an applications server, which subscribed to the mobility manager. The bandwidth is controlled to the effect that these mobile node MN which are non-mobility manager subscribers do not consume so much bandwidth that they prevent mobility-managed mobile nodes from receiving a fair distribution of the available bandwidth. A more detailed illustration of a mobility management architecture is provided in FIG. 2.

In FIG. 2 the mobility manager MM is shown with the mobility manager register 10 and an access gateway node 20 within a section 22 which is controlled by an operator of the mobility management network. As mentioned above the applications server AS, provided within an area 24 controlled by a service provider is arranged to provide communications services to the mobile node MN. The communications services may provide multi-media communications providing within a communications session different session levels, each level corresponding to a different type of media which can be communicated using a quality of service required by that level. The mobility manager MM controls the handover of these mobile nodes between the access networks and between the access points within the access network to the effect of providing wherever possible the highest communications service level corresponding to the quality of service provided on a link which the access point is able to support.

The mobile node MN which is controlled by the end user 26 is attached to one of the access points AP 28 of one of the access networks 30. The access network 30 may include a plurality of access points AP, which are controlled by the access gateway (not shown) of the network 30. Within the access network 30 there is a router 32 via which all internet packets flow into and out of the access network 30, whether these are for signalling data or control plane data. As illustrated in FIG. 2 the broken line shows the passage of the user plane data whereas the solid line shows the communication of control plane data.

Also provided as part of the access network 30 is a traffic shaper 34. The traffic shaper 34 controls an amount of bandwidth available from the access point, which is used by non mobility-managed mobile nodes for each of a plurality of different types of traffic and mobility-managed mobile nodes, which are attached to the networks and the access point. The traffic shaper 34 controls the distribution of bandwidth in accordance with a traffic pattern. As will be explained shortly, the traffic pattern is adapted dynamically by the mobility manager. The traffic shaper 34 can thereby control, in accordance with the adapted traffic pattern, the amount of bandwidth which is provided to each of the different types of traffic and the mobility-managed mobile nodes attached to the access point. However, the number of access points AP which may be associated with an access gateway within an access network may change dynamically. As such, the traffic shaper, according to one example of the present technique, can be arranged to discover the access points within the access network and inform the access gateway of these access points. The traffic shaper 34 can furthermore update the list of access points held in the access point date base 110, when the list of access points changes. A more detailed illustration of the form of an access network in accordance with the present technique is illustrated in FIG. 3.

In FIG. 3 a mobility manager MM is shown to communicate internet packets providing control data to and from a mobile node MN via a virtual communications path 100. The access network receives internet packets from the mobility manager and communicates internet packets to the mobility manager via a router 102. These internet packets also pass through the traffic shaper 104 as explained above with reference to FIG. 2. However, as shown in more detail in FIG. 3, the traffic shaper 104 includes an access gateway 106 as well as a Mobility Manager Access Network Evaluation Traffic Shaper (MM ANETS) module 108 and an access points database 110. The access network also includes switches (layer 2-OSI) 112, 114, 116 which route internet packets to and from access points AP1, AP2, APN which form part of the access network.

As explained in European Patent Application No. 04292921.6 in order to control congestion and handover of mobile nodes, the mobile nodes MN communicate mobile node evaluation messages MNE to the mobility manager MM reporting on a current link quality which is experienced by the mobile node. The mobile node evaluation messages (MNE) provide information on all the access points AP which can be detected by the mobile nodes. The mobile node evaluation messages MNE pass through the MM ANETS module 108 before being communicated to the mobility manager MM. Thus the MM ANETS module 108 can analyse the MNE messages and extract information to identify the access points APn within the access network from which the MNE messages were communicated by the mobile nodes MN. Having identified the access points, the MM ANETS module 108 communicates the identified access points to the access point database 110 which is also utilised by the access gateway 106. Thus in summary the access gateway must have a list of access points which are included within the radio access network. The mobility-managed mobile nodes MN which are controlled by the applications server to receive a communications service under the influence of the mobility manager, send Mobile Node Evaluation (MNE) messages which contain information about the access points seen by the mobile node to the mobility manager. The MNE messages are sent to the mobility manager MM via the traffic shaper. The MM ANETS module in the traffic shaper 104 then extracts access point information from the MNE messages, compiles a list of access points and deposits this in the access point database 110. The traffic shaper can then monitor a use of the bandwidth from the access point by analysing internet packets, which pass to and from the mobile nodes, which are attached to the access points. By analysing the internet packets, the traffic shaper can determine the protocol with respect to which the internet packets are being generated. The traffic shaper can then determined an amount of bandwidth being used for each protocol by traffic type.

In one example the access network shown in FIG. 3 is a wireless local area network (WLAN) and may only have one access point for example providing a communications bandwidth of 11 Mb/s. However, a practical maximum bandwidth may only be 7.1 Mb/s. This bandwidth is divided between outgoing traffic and incoming traffic, an example division of bandwidth being shown for example in the schematic block diagram in FIG. 4. As shown in FIG. 4 each of the ingoing and outgoing traffic is divided. For the ingoing traffic there is a total minimum bandwidth which is guaranteed of 2.55 Mb/s although the actual bandwidth used may be as much a 5.8 Mb/s. In contrast, the outgoing traffic may have a total minimum bandwidth guarantee of 550 kb/s with an actual bandwidth which is used for outgoing traffic of 1.3 Mb/s.

As mentioned above the bandwidth available to the access network is divided between each of a plurality of different traffic types for non mobility-managed mobile nodes and between mobility managed mobile nodes, which are currently attached to the access point. The mobility-managed mobile nodes receive bandwidth allocations from the mobility manager MM via the applications server or may be mobile nodes which have not subscribed and are using different services such as e-mail or web-browsing. Hence the bandwidth for these mobile nodes MN which have not subscribed to the mobility manager MM are controlled from the different traffic types. The allocation of the available bandwidth for the ingoing and outgoing traffic is controlled by the traffic shaper 104 in accordance with a traffic pattern, one for the ingoing traffic and one for the outgoing traffic. An example illustration of an ingoing traffic pattern and an outgoing traffic pattern for the WLAN is provided in FIGS. 5 and 6 respectively. In FIGS. 5 and 6 the traffic pattern includes four columns. In a first column 202, 204 protocols are identified which are not permitted on the access point and are therefore rejected. In a second column 206, 208 a list of non mobility-managed services is provided. These include such things as e-mail, web browsing, virtual protocol networks (EPN), downloading and other non mobility managed services. As shown with respect to each protocol a minimum bandwidth which is guaranteed for that protocol is indicated together with the current actual bandwidth which is given to that protocol. There is also shown a priority which is given for that traffic type. Thus each of the entries in the second column 206, 208 provides one of a different plurality of traffic types. Each of the traffic types is identified with respect to the parameters, which are to be controlled by the traffic shaper. For the example of web browsing in the second column of the ingoing traffic 206, the minimum bandwidth guaranteed is 1 Mb/s whereas the actual bandwidth currently used is 1 Mb/s and this traffic type has a priority of three.

In the third column 210, 212 of the ingoing and outgoing traffic patterns, a list of entries of mobile nodes which are using mobility managed services are provided. So each segment in the third column 210, 212 of FIGS. 5 and 6 identifies a mobility-managed users together with a current bandwidth allocation and a priority given to that user with respect to other traffic types. Thus in the ingoing traffic pattern in FIG. 4 in the third column 210 a mobile user 45 has been allocated 200 kb/s and has a priority 4.

In the fourth column 214, 216 of the ingoing and outgoing traffic patterns shown in FIGS. 5 and 6, a plurality of the segments are shown which identify protected protocols. These protocols take the highest priority and are guaranteed a certain bandwidth for the protocol type. Thus, as shown in the outgoing traffic pattern in the fourth column 216 a voice-over IP protocol is allocated a bandwidth of 250 kb/s with the highest priority. As illustrated by an arrow 218, 220 the columns of the traffic pattern are arranged with increasing priority going from right to left across the page.

As explained above, according to the present technique the traffic pattern for the traffic shaper TS, 104 is adapted in accordance with the demands of the non mobility-managed mobile nodes for each of the different traffic types and the requests by the applications server to the mobility manger for bandwidth to be allocated to the mobility-managed mobile nodes. Thus, in accordance with the present technique the mobility manager MM performs a traffic shaping algorithm to adapt the traffic pattern and maintains the traffic pattern for each of the traffic shapers. The mobility manger MM adapts the traffic pattern in accordance with information received from each of the traffic shapers in Traffic Shaper Report messages, which are communicated from the traffic shaper to the mobility manager. Messages communicated between the traffic shaper the mobility manager, the mobility manager register and the applications server in accordance with the present technique are illustrated in FIG. 7.

In FIG. 7 each of the elements which are involved in the traffic shaping algorithm are illustrated with respect to a message flow. Thus the mobile node MN communicates mobile node evaluation messages MNE to the access gateway within the traffic shaper TS using message M1. The traffic shaper TS then evaluates from the current use of bandwidth for each of the different traffic types and the mobile nodes forms a Traffic Shaping Request message M2 requesting a reallocation of the access point's available bandwidth and communicates the TSR message to the mobility manager MM. The applications server AS does not take part in general updates of the traffic shaping pattern although as will be explained shortly the applications server AS may request a change of bandwidth for a particular mobile node from the mobility manager which will also trigger the traffic shaping algorithm 310. As such, the applications server AS may determine that one or more of the mobility-managed mobile nodes requires an increase or a decrease in a bandwidth allocation from the access point to which it is attached. As shown in FIG. 7, the applications server AS therefore sends an applications server message M3 to the mobility manager to request a change in bandwidth allocation for the one or more mobile nodes.

As illustrated by a message exchange M4 the mobility manager MM then updates the mobility manger register 300 with a current bandwidth used by the mobile nodes communicating via the particular access point. The mobility manager register 300 acknowledges the update, which represents context information. In accordance with a message exchange M5 the mobility manager MM interrogates the mobility manager register 300 for current context information for the mobile nodes which are attached to the access point for which the traffic shaping algorithm is to be performed. The mobility manager register 300 replies with a current minimum bandwidth and other information associated with a current service which the mobile nodes attach the particular access point are using. As illustrated by an arrow 310 the mobility manager MM then performs the traffic shaping algorithm to update the traffic pattern associated with the access point. The mobility manager MM then updates the traffic shaper with the adapted traffic pattern using a Traffic Shaper Reply enforcement (TSRe) M6.

In order to make the mobility manager traffic shaping protocol independent of IP version, the messages illustrated in FIG. 7 may be written in the application layer so that for example the messages could be XML messages over TCP/IP or UDP/IP.

As mentioned above, the two messages which are required for the traffic shaping algorithm are:

Traffic Shaper Report (TSR); the traffic shaper is the component that allows collecting information on the sessions of a mobile node connected to an access point and provides a message containing information on a mobile node session to be sent to the mobility manager.

Traffic Shaper Reply enforcement (TSRe) which is sent by the mobility manager to the traffic shaper to enforce decisions on sharing the resources between different mobile nodes attached to the particular access point.

Performance of the Traffic Shaping Algorithm to Update the Traffic Pattern

Figure 8:
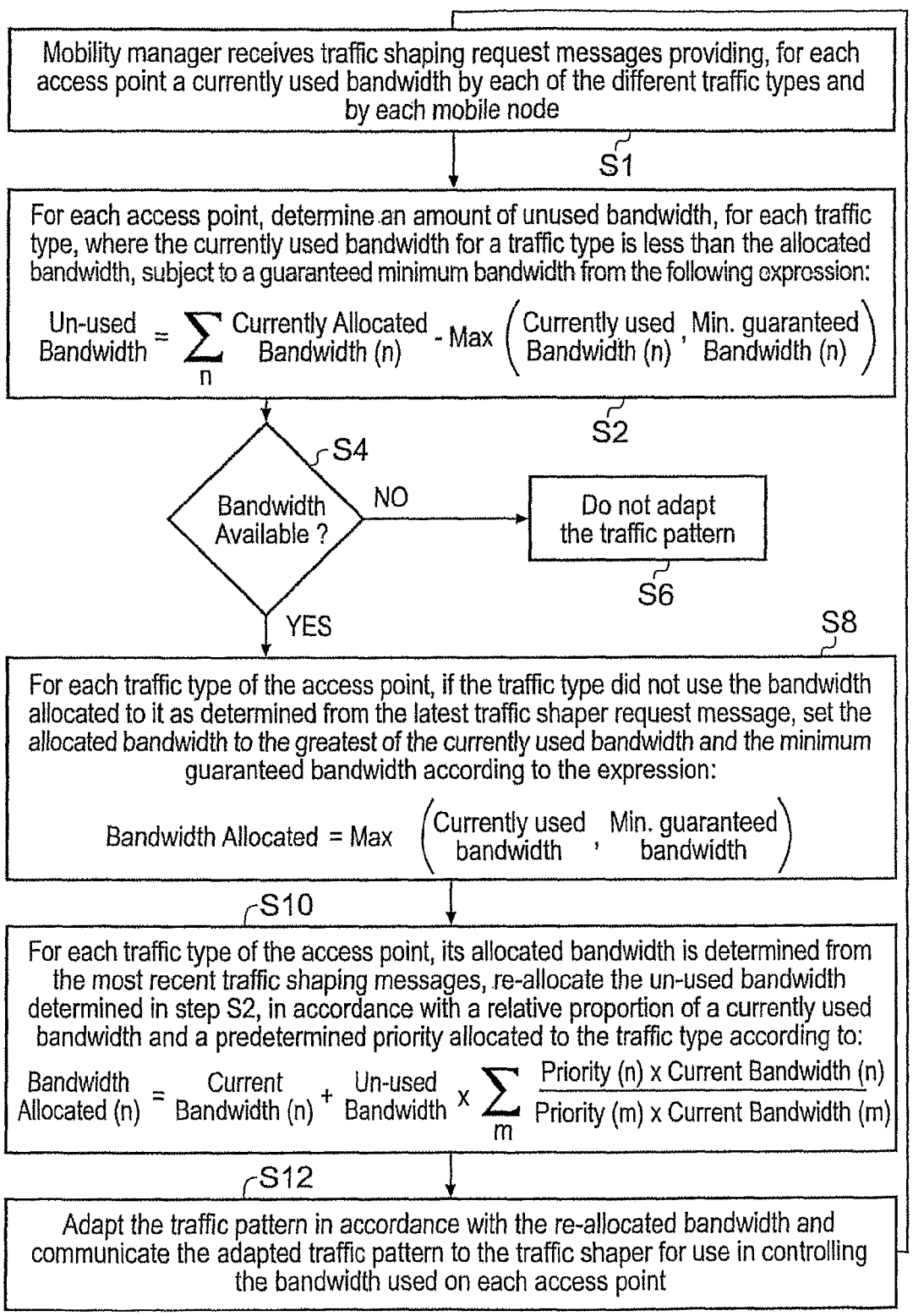
FIG. 8 is a flow diagram illustrating a process of adapting dynamically a traffic pattern of a traffic shaper by a mobility manager.

As indicated above with reference to FIG. 7 the mobility manager performs the traffic shaping algorithm to update the traffic pattern for each access point after receiving traffic shaping reports. A general process of updating the traffic pattern for each traffic shaper is illustrated in FIG. 8. FIG. 8 is summarized as follows:—

S1: The mobility manager MM receives a TSR message from the access point providing information on a current used of bandwidth by the non mobility-managed mobile nodes for each of the different traffic types and by each mobility-managed mobile node which is managed by the mobility manager MM.

S2: For each access point, an amount of unused bandwidth (Un-usedBW) is determined from each traffic type, which did not use its maximum allocated bandwidth. Thus, the mobility manager compares the currently allocated bandwidth with the greater of the currently used bandwidth and the minimum guaranteed bandwidth. If the allocated bandwidth is greater than the maximum of the currently used and the minimum guaranteed bandwidth, then the un-used bandwidth is calculated. Therefore for each traffic type and each mobile node a difference between a currently allocated bandwidth (AllocatedBW) and a maximum of the currently used bandwidth (currentBW) and the minimum guaranteed bandwidth (Minguaranteed) is calculated according to the following expression:

$$UnusedBW = \sum_n (AllocatedBW(n) - \max(currentBW(n), Minguaranteed(n)))$$

S4: The mobility manager determines whether as a result of the calculation in step S2 there is any bandwidth available to be reallocated between the different traffic types.

S6: If there is no bandwidth available then the traffic pattern is not updated and the process loops around to receiving the next TSR messages from the Traffic Shaper.

S8: However if there is bandwidth available then the mobility manager for each access point, allocates for each traffic type which did not use its allocated bandwidth, a maximum of the currently used bandwidth and the minimum guaranteed bandwidth. Thus, the mobility manager again compares the allocated bandwidth of each traffic type with a maximum of the currently used bandwidth and the minimum guaranteed bandwidth. Where the allocated bandwidth exceeds the maximum of the allocated and the minimum guaranteed bandwidth, the mobility manager sets the allocated bandwidth to the maximum of the currently used and the minimum guaranteed bandwidth. This is calculated by the following expression:

If: AllocatedBW(n)>max(currentBW(n),Minguaranteed(n))
Then: AllocatedBW(n)=max(currentBW(n),Minguaranteed(n))
Else S10

S10: The mobility manager, for each access point, re-allocates the unused bandwidth (UnusedBW) to the non mobility-managed mobile nodes for each different traffic type in accordance with a relative portion of a currently used bandwidth (currentBW) and a predetermined priority (priority) allocated to the mobile node and the traffic type in accordance with the following expression:

$$NewAllocated(n) = currentBW(n) + UnusedBW \times \frac{\text{priority}(n) \times currentBW(n)}{\sum_m \text{priority}(m) \times currentBW(m)}$$

S12: The traffic pattern is then adapted by the mobility manager in accordance with the newly allocated bandwidth to form an adapted traffic pattern. The mobility manager then communicates the adapted traffic pattern to the traffic shaper for use in controlling the bandwidth used on each access port.

FIGS. 9a and 9b provide an illustration of an update of a traffic pattern for an access point, as performed by the mobility manager, for three example traffic types of web browsing, File Transfer Protocol (FTP) and Virtual Protocol Network (VPN) and two Mobility Managed (MM) mobile nodes MM user 1, MM user 2. As shown in FIG. 9a each traffic type includes a currently allocated bandwidth a priority an indication of a currently used bandwidth as provided by the TSR messages and a minimum guaranteed bandwidth. So, for the example of web browsing, a currently allocated bandwidth is 1 Mb/s, with a priority of three, a used bandwidth of 1 Mb/s and a minimum guarantee bandwidth of 600 kb/s. Therefore, in accordance with the step S2 above the mobility manager determines that there is no bandwidth to be reallocated from the web browsing protocol, because all of the allocated bandwidth of 1 Mb/s is currently being used. In contrast, for the File Transfer Protocol (FTP) traffic type, from an allocated bandwidth of 2 Mb/s, only 1 Mb/s was used so that 1 Mb/s can be reallocated from FTP. As illustrated in FIG. 9b, the 1 Mb/s has been re-allocated from the FTP service to the Web browsing and the Virtual Private Network (VPN) protocol in accordance with the relative priority given to each protocol and the amount of bandwidth which was being used. According to step S10, the Web browsing protocol receives 900 kb/s and VPN receives 100 kb/s, so that the total allocated bandwidth is 1.9 Mb/s and 390 kb/s for Web browsing and VPN respectively.

For a mobile node which is mobility-managed an allocated bandwidth is 1 Mb/s for MM user 1 with a priority of 4 with a current bandwidth usage of 500 kb/s. However, the bandwidth is not reallocated from the mobility-managed mobile nodes because the bandwidth allocation to mobile nodes is managed by the applications server. The mobility manager only allocates bandwidth to mobility-managed mobiles nodes on request from the applications server.

FIG. 9b provides an illustration of the traffic shaping pattern following an update of the pattern by the mobility manager. As illustrated the calculated unused bandwidth has been distributed amongst the traffic types in accordance with a relative priority and an amount of bandwidth, which was previously being used in accordance with the expression provided in step S8. Thus the share of the unused bandwidth provided to web browsing with respect to the minimum guarantee bandwidth of 600 kb/s is 900 kb/s making allocated bandwidth 1.9 Mb/s. In contrast for the FTP traffic type, of the allocated bandwidth of 2 Mb/s, only 1 Mb/s was currently being used and so has been allocated a bandwidth of 1.0 Mb/s.

Figure 10:
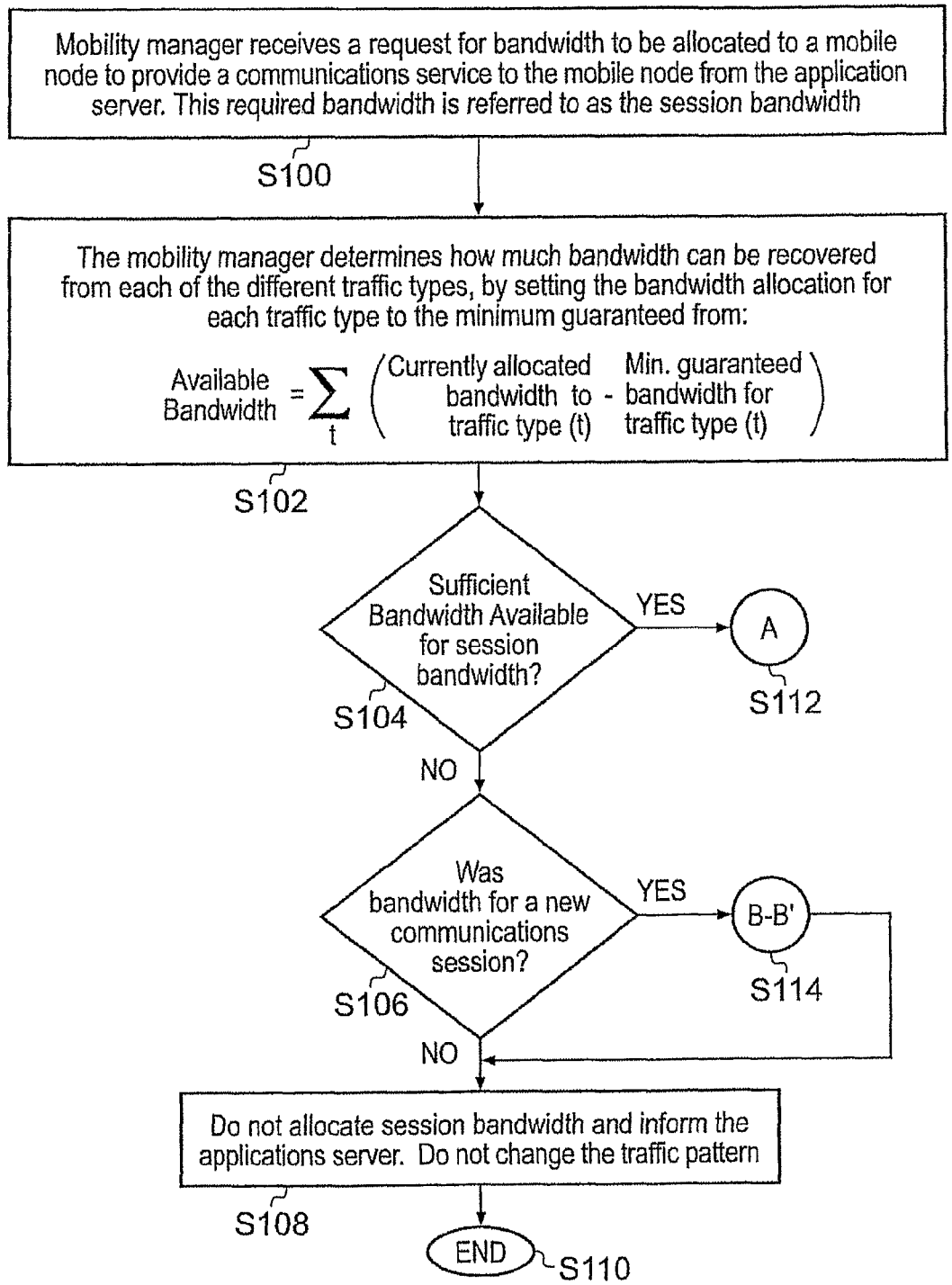
FIG. 10 is a flow diagram illustrating a first part of a process performed by the mobility manager to allocate bandwidth to an applications server in response to a request from the applications server.

Mobility Manager Performing Traffic Shaping Following Request form Applications server FIGS. 10, 11, 12 and 13 provide flow diagrams illustrating the operation of the mobility manager when performing the traffic shaping algorithm for the case where the applications server requests an increase in bandwidth to fulfil a requirement for a mobile node with respect to a communications session. The flow diagrams in FIGS. 10, 11, 12 and 13 will present the operation of the mobility manager for different outcomes of the traffic shaping algorithm. A common flow in the traffic shaping algorithm is represented in FIG. 10 which is summarised as follows:

S100: The mobility manager receives a request for bandwidth to be allocated to a mobile node to provide a communications service to the mobile node from the applications server. The request for a bandwidth may be to allow a mobile node to handover to an access point thus requiring bandwidth from that access-point, or it may be that the mobile node has been switched on by the user and requests bandwidth from that access point in order to begin communicating. Alternatively, the requirement for bandwidth may be to provide a mobile node which is already attached to an access point to allow the mobile node to increase a service level to allow for example a different media type to be communicated such as from audio to video material. This required bandwidth is referred to in the following description and in FIGS. 10 to 13 as the session bandwidth.

S102: The mobility manager determines how much bandwidth can be recovered from each of the different traffic types t (AvailableBW) by setting the bandwidth allocation for each traffic type to the minimum guaranteed bandwidth (Minguaranteed) with respect to the bandwidth currently allocated to this traffic type (Allocatedtraffic). This is expressed by the following expression:

$$AvailableBW = \sum_{t}(Allocatedtraffic(t) - Minguaranteed(t))$$

S104: The mobility manger determines whether the bandwidth available from each of the traffic types is sufficient to meet the required session bandwidth. If the available bandwidth is sufficient to meet the required session bandwidth then processing proceeds from point A to the flow diagram in FIG. 11 described below.

S106: If the bandwidth which is available from the different traffic types is not sufficient to satisfy the required session bandwidth then the mobility manager determines whether the required session bandwidth is required for a new communications session, that is, the bandwidth is not required to increase a service level for a mobile node.

S108: If the session communications bandwidth is not required for new communications session then the mobility manager concludes that the session bandwidth should not be allocated to the mobile node and the mobility manager therefore informs the applications server that the request for the session bandwidth is denied. Therefore the traffic pattern is not updated and processing proceeds to step S110. In contrast if the bandwidth was required for a new communications session then processing proceeds through point b according to the flow diagram in FIGS. 12 and 13.

S110: The traffic shaping algorithm then ends.

S112: Alternatively as indicated for step S104, if there is sufficient bandwidth to provide the session bandwidth, then the bandwidth is allocated and any remaining bandwidth is re-allocated as per the process represented by the flow diagram in FIG. 11.

S114: If the bandwidth required by the applications server is to be allocated to a new communications session, then processing proceeds to determine whether there is one or more other mobility managed-mobile nodes which have a lower priority than the mobile node for which a new communications session is to be established. If there is one or more lower priority mobile nodes then a communications session for these mobile nodes is closed and the bandwidth re-allocated as represented by the flow diagram of FIGS. 12 and 13.

Figure 11:
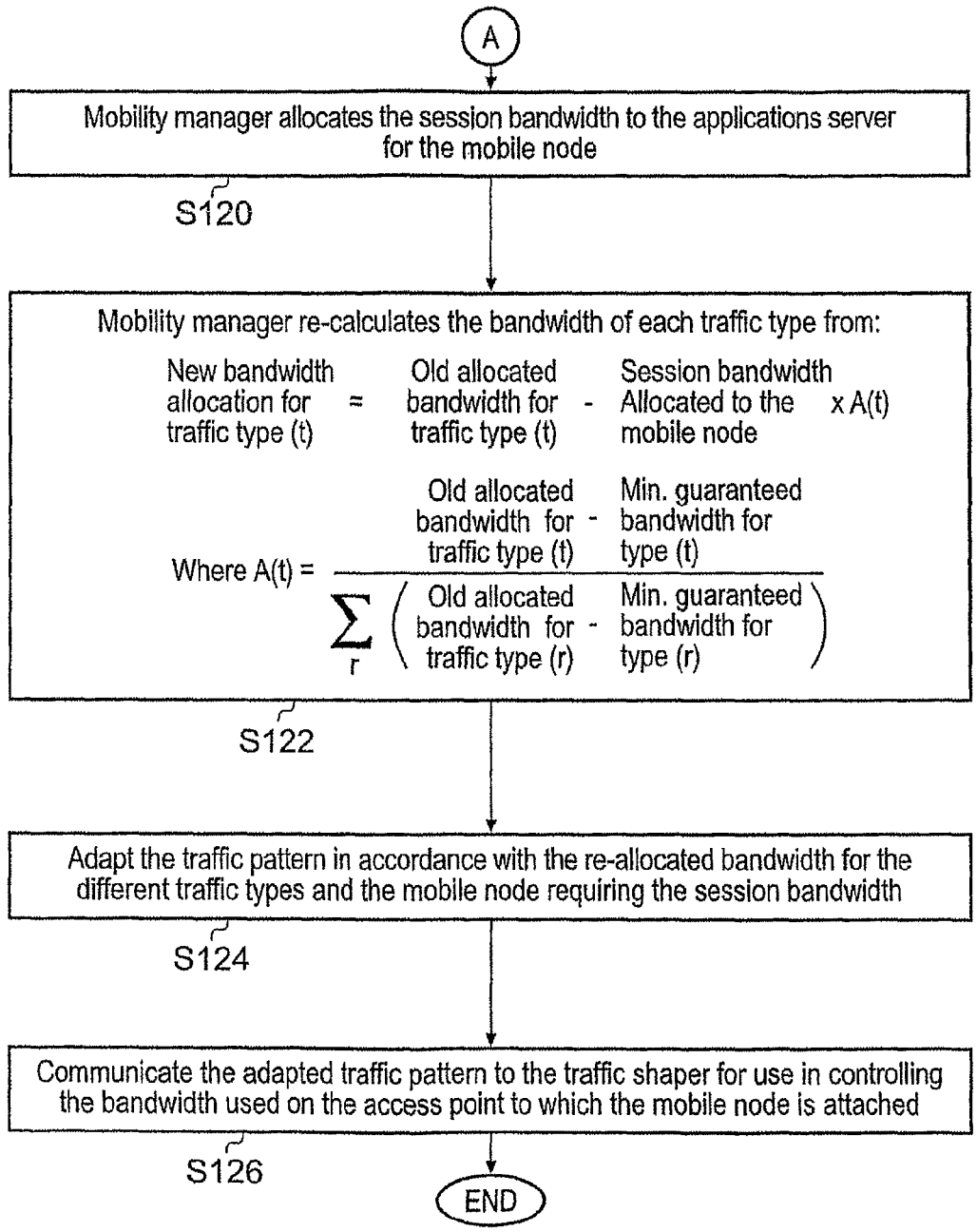
FIG. 11 is a flow diagram illustrating a further part of the process illustrated in FIG. 10, in which the required session bandwidth can be recovered from the plurality of different traffic types, and re-allocated any remaining bandwidth to the traffic types.

Referring to the option illustrated in FIG. 10 by the process performed from point A, this process is illustrated by the flow diagram in FIG. 11. According to this option within the traffic shaping algorithm the mobility manager allocates the session bandwidth to the applications server and then updates the bandwidth allocated to each of the traffic types. The flow diagram of FIG. 11 is summarised as follows:

S120: The mobility manager allocates the session bandwidth to the applications server for the mobile node.

S122: The mobility manager then recalculates the bandwidth of each traffic type in accordance with a bandwidth which remains after the session bandwidth (sessionBW) has been allocated in proportion to a relative amount which that traffic type had to surrender (oldBWAllocated(t)−Minguaranteed(t)) in order to allocate the required session bandwidth to the mobile node. The mobility manager calculates the new bandwidth for each traffic type in accordance with the following expression:

$$NewBWAllocated(t) = oldBWAllocated(t) - sessionBW \times A(t)$$

where $$A(t) = \frac{(oldBWAllocated(t) - MinguaranteedBW(t)}{\sum_{r}(oldBWAllocated(r) - MinguaranteedBW(r))}$$

S124: The traffic pattern is adapted in accordance with the allocated bandwidth for the different traffic types and the mobile node which has been allocated the required session bandwidth.

S126: The adapted traffic pattern is then communicated to the traffic shaper for use in controlling the bandwidth used on the access point to which the mobile node is attached.

Figure 12:
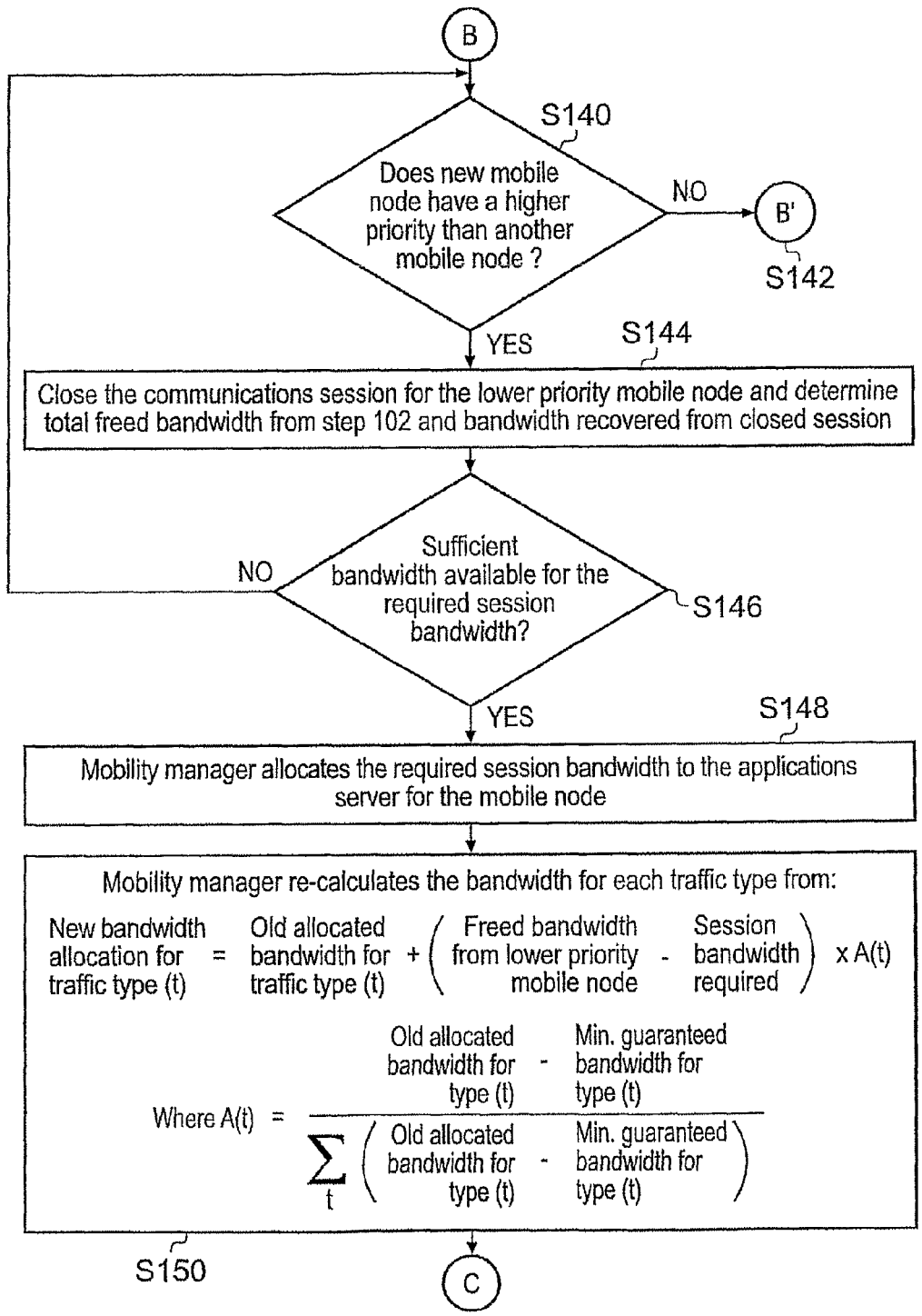
FIG. 12 is a flow diagram illustrating a further part of the process illustrated in FIG. 10, in which the required session bandwidth is provided by closing a communications session from a lower priority mobile node, and allocating the freed bandwidth to provide the required session communications bandwidth.
Figure 13:
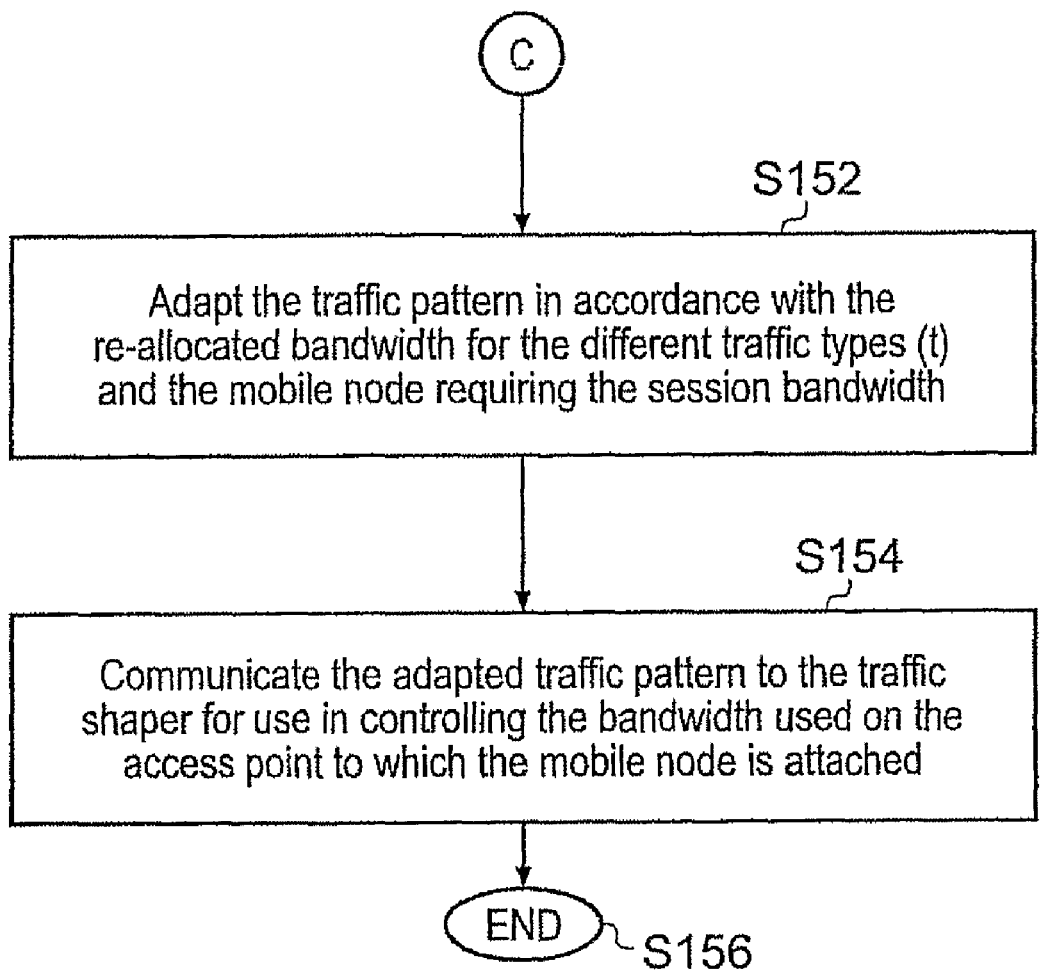
FIG. 13 is a flow diagram illustrating a further part of the process illustrated in FIG. 12.

For the branch in FIG. 10 in which the allocated bandwidth was not sufficient to provide the required session bandwidth, but the bandwidth was required for a new communications session then processing proceeds from point B as illustrated in FIGS. 12 and 13. FIGS. 12 and 13 are summarised as follows:

S140: The mobility manager determines whether the mobile node to which the required session bandwidth is to be allocated has a higher priority than another mobile node currently attached to that access point. The priority is predetermined in accordance with a subscription level for which the user of the mobile node has subscribed, which is stored in the mobility manager register 10, 300 and retrieved by the mobility manager MM.

S142: If the new mobile node does not have a higher priority than another mobile node attached to the access point then processing proceeds from B', that is through the branch to step S108 shown in FIG. 10.

S144: If the new mobile node does have a higher priority than another mobile node which is attached to the access point then the communications session for that lower priority mobile node is closed, thereby freeing bandwidth to be allocated to the new mobile node. The mobility manager then determines the total freed bandwidth (FreedBW). The total freed bandwidth is determined from the bandwidth freed by closing the communications session for the lower priority mobile node in combination with bandwidth recovered by setting each traffic type to the minimum guaranteed bandwidth (as per step S102).

S146: The mobility manager then determined whether there is sufficient bandwidth to satisfy the requirement for the session bandwidth from the new mobile node. If the bandwidth is not sufficient to meet the required session bandwidth then processing loops back to step S140.

S148: If the bandwidth freed by closing the communications session for the lower priority mobile node is sufficient to meet the required session bandwidth then the mobility manager allocates the required session bandwidth to the applications server for that mobile node.

S150: The mobility manager then recalculates the bandwidth for each of the traffic types to the effect of redistributing any of the remaining bandwidth allocated to meet the required session bandwidth. The bandwidth is allocated by calculating the remaining bandwidth by subtracting the allocated session bandwidth (sessionBW) from the total freed bandwidth (FreedBW) and allocating this remaining bandwidth in proportion with the relative amount of bandwidth which each traffic type had to give up in order to free sufficient bandwidth for the new mobile node. This is calculated in accordance with the following expression:

$$NewBWAllocated(t) = \\ MinguaranteedBW(t) + (FreedBW - SessionBW) \times A(t)$$

$$\text{where } A(t) = \frac{(oldBWAllocated(t) - MinguaranteedBW(t))}{\sum_r (oldBWAllocated(r) - MinguaranteedBW(r))}$$

As shown in FIG. 13 where processing proceeds from point C in FIG. 12 the traffic pattern is then adapted in accordance with the reallocated bandwidth for the different traffic types and the new mobile node which has been allocated the required session bandwidth.

S154: The adapted traffic pattern is then communicated to the traffic shaper and used for controlling the bandwidth on the access point to which the mobile node is attached.

S156: The traffic shaping algorithm then ends for the current traffic shaping request.

Figure 14A:
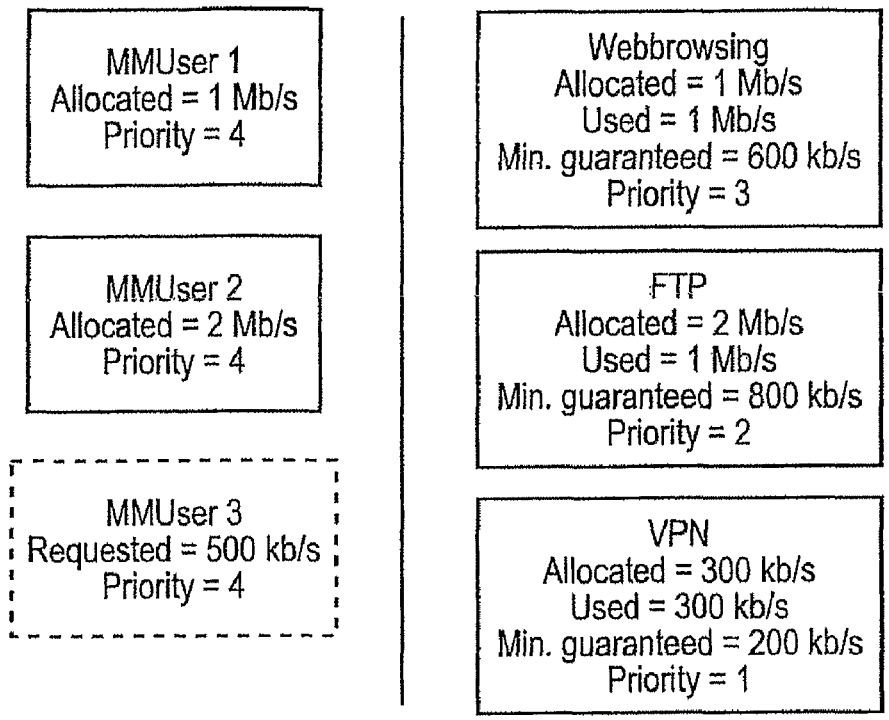
FIG. 14a provides an example of a traffic pattern before adaptation by the mobility manager where the mobility manager is allocating bandwidth to the applications server to provide a communications service to a newly active mobile node, whereas FIG. 14b provides the traffic pattern after adaptation by the mobility manager.
Figure 14B:
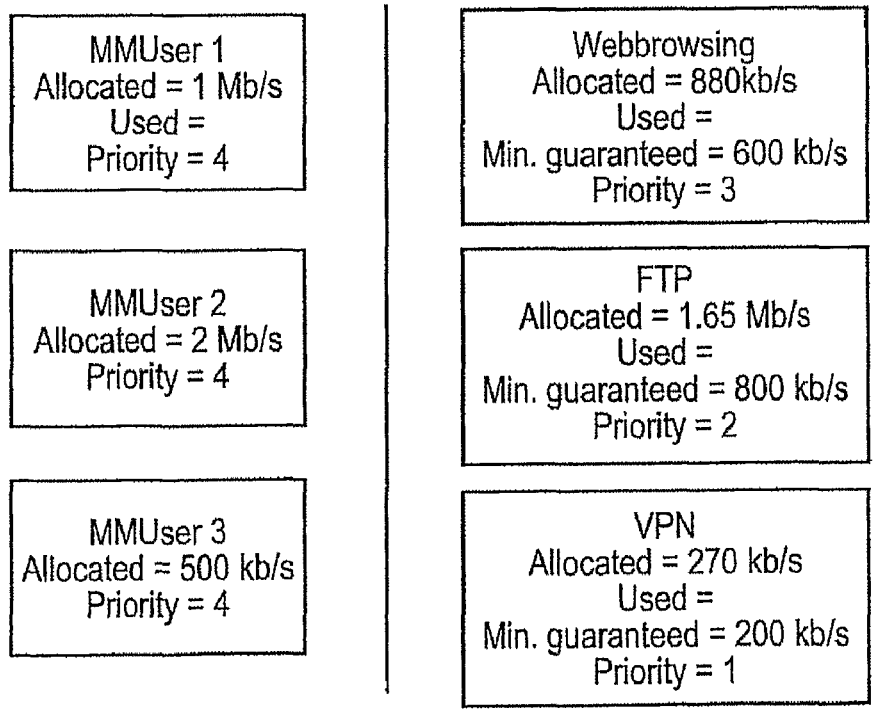

FIGS. 14a and 14b provide an illustration of the adaptation of a traffic pattern for an access point where a new mobile node has been ordered by the mobility manager to attach to the access point. The new mobile node MM user 3 is shown in FIG. 14a by a broken outline whereas mobile nodes MM user 1, MM user 2 have a solid outline to show a segment of the traffic pattern which is already present. The segments corresponding to the different traffic types are otherwise the same as those illustrated in FIGS. 9a and 9b. As illustrated by FIG. 14b, as a result of setting each of the traffic types to the minimum guaranteed bandwidth, 1.7 Mb/s of bandwidth is freed which easily accommodates the 500 kb/s requested by the new mobility managed mobile node MM user 3. As a result the 1.2 Mb/s is then redistributed between each of the traffic types resulting in a reduction with respect to the previous allocation but an allocation which is greater than the minimum guaranteed bandwidth.

Figure 15:
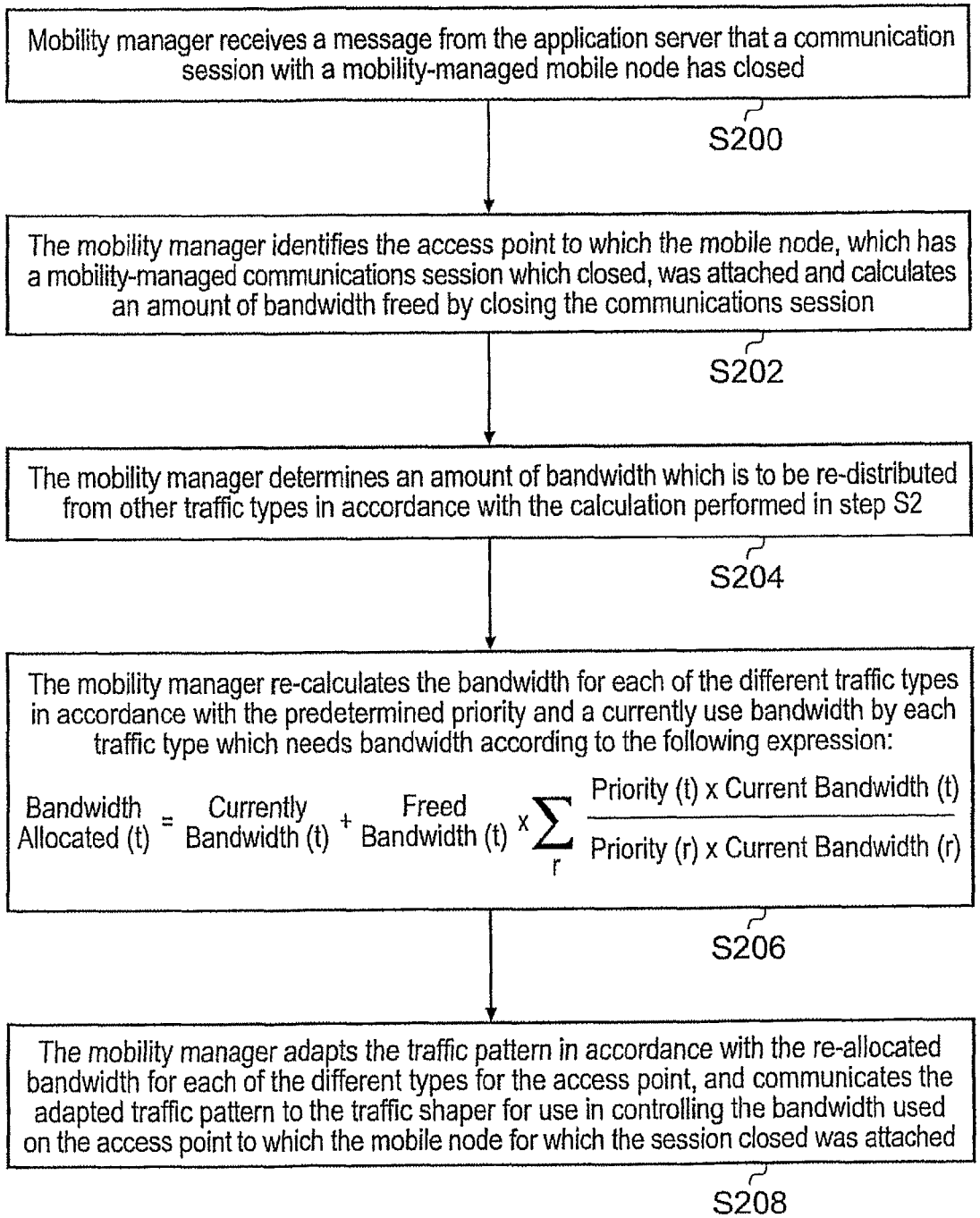
FIG. 15 is a flow diagram illustrating a process performed by the mobility manager to re-allocate bandwidth to a plurality of different traffic types, after a communications session provided to a mobility-managed mobile node has decreased or closed.

Traffic Shaping Algorithm for the Mobility Manager Decreasing or Closing a Communications Session A further example of a traffic shaping algorithm performed by the mobility manager when the applications server closes or decreases the level of a communications session is provided by the flow diagram in FIG. 15. FIG. 15 provides an example of re-allocating bandwidth amongst the different traffic types, after a communications session from a mobility managed mobile node closes. However, it will be appreciated that the example represented by the flow diagram of FIG. 15 can be correspondingly adapted for an example where bandwidth is freed when a communications session level for a mobility managed mobile node decreases. FIG. 15 is summarised as follows:—

S200: The mobility manager when performing a traffic shaping algorithm receives a message from the applications server that a communications session with a mobile node has closed or has decreased.

S202: The mobility manager then identifies the access point to which the mobility-managed mobile node was attached for which a bandwidth requirement for the communications session has decreased or the communications session has closed, and calculates an amount of bandwidth freed by closing or decreasing the communications session.

S204: The mobility manager then determines whether there is any bandwidth to be re-allocated from the other traffic types as per the calculation performed in step S2 of the flow diagram in FIG. 8. If there is bandwidth to be reallocated from each of the traffic types, then this is combined with the bandwidth released by closing or decreasing the bandwidth for the communications session which has closed or decreased to form a total freed bandwidth.

S206: The mobility manager recalculates the bandwidth allocation for each traffic type (AllocatedBWtraffic(t)), which consumed all its allocated bandwidth, by determining a share of the freed bandwidth (FreedBW) in accordance with the predetermined priority (priority) and a currently used bandwidth (currentBW) from the following expression, which corresponds that in step S10:

$$AllocatedBWtraffic(t) = \\ currentBW(t) + FreedBW \times \frac{\text{priority}(t) \times currentBW(t)}{\sum_r \text{priority}(r) \times currentBW(r)}$$

Where in the above expression r is the figure of traffic types which are using all their respected minimum guaranteed bandwidth (allocated BW=current BW used).

S208: The mobility manager then adapts the traffic pattern in accordance with the allocated bandwidth for the different traffic types used by the non mobility-managed mobile nodes attached the access point. The mobility manager communicates the adapted traffic pattern to the traffic shaper for use in controlling the bandwidth used on the access point where the mobile node for which the applications server has just closed a communications session was attached.

FIG. 16a and FIG. 16b provide an illustration of an adaptation of a traffic pattern before and after a communications session is closed for a mobile node MN user 1. As can be seen from FIG. 16a the mobile node MN user 1 has allocated bandwidth of 1 Mb/s. The 1 Mb/s is combined with the 1 Mb/s freed from the FTP traffic type to form a total freed bandwidth to be reallocated of 2 Mb/s. As illustrated in FIG. 16b the 2 Mb/s is distributed between the traffic types of web browsing and VPN in proportion with a relative priority of each of these traffic types and a current bandwidth which is being used. As a result for example web browsing receives an increased allocation of 1.8 Mb/s to provide an allocation of 2.8 Mb/s and VPN receives an increase in bandwidth allocation of 200 kb/s to provide an allocation of 481 Kb/s.

Presentation of the Traffic Shaping Messages

As mentioned above, in order to communicate the traffic shaping request and reply messages to the mobility manager in a way, which is, independent of internet protocol version, these are written in the application layer. Practically, these messages could be some XML messages over TCP/IP or UDP/IP. Examples of these massages are present below:

Traffic Shaping Request (TSR) Message

Traffic Shaping Request message (TSR) is sent from the traffic shaper to the mobility manager to provide information on the sessions of a user connected to an access network. The header of the TSR contains the following information:

| | |
|---|---|
| message type (1 byte): | 05 identifies Traffic Shaping Request messages. |
| sequence number (1 byte): | this value is updated each time an TSR is sent |
| lifetime (1 byte): | this value gives the validity time of the message |
| sender identifier (6 bytes): | this value uniquely identifies the traffic shaper that sends the message and is its MAC address. |

The Access Point part contains the following information:

| | |
|---|---|
| access network type (1 byte): | Identifies the type of access network (01 = cellular; 02 = 802.11 . . . ). |
| ani_length (1 byte): | this value gives the length of the ANI in bytes. |
| access Network Identifier: (1 to 32 bytes) | this value uniquely identifies the access network. It is the PLMN for GPRS and SSID for WLAN. |
| access Point Identifier: (0-6 bytes) | this value uniquely identifies an access point in an access network and is its MAC address. |
| number of segments (1 byte): | this value gives the number of segments reported in the message. |

The segment part contains the following information:

| | |
|---|---|
| Segment identifier (1 byte): | this value uniquely identifies a segment of bandwidth |
| Bandwidth used (4 bytes): | this value identifies the actual bandwidth used in the segment in kb/s |

Traffic Shaping Reply Messages (TSRe)

Traffic Shaping Reply (TSRe) is sent by the Mobility Manager to the traffic shaper to enforce decisions on the sharing of the resources between the different users of an access network. The format of the TSRe message contains the following information:

| | |
|---|---|
| message type (1 byte): | 06 identifies Traffic Shaping Request messages. |
| sequence number (1 byte): | this value is updated each time an TSRe is sent |

The Access Point part contains the following information:

| | |
|---|---|
| access network type (1 byte): | Identifies the type of access network (01 = cellular; 02 = 802.11 . . . ). |
| ani_length (1 byte): | this value gives the length of the ANT in bytes. |
| access Network Identifier: (1-32 bytes) | this value uniquely identifies the access network. It is the PLMN for GPRS and SSID for WLAN. |
| access Point Identifier: (0-6 bytes) | this value uniquely identifies an access point in an access network and is its MAC address. |
| number of instructions (1 byte): | this value gives the number of instructions reported in the message. |

The Instruction part contains the following information:

| | |
|---|---|
| Segment identifier (1 byte): | this value uniquely identifies a segment of bandwidth |
| New length (4 bytes): | this value identifies the new length of the segment in kb/s |
| Segment service (4 bytes): | this value identifies the IPMM service |
| Segment source address (4 bytes): | this value gives the IP source address of the packets sent for the IPMM service |
| Segment destination address (4 bytes): | this value gives the IP destination address of the packets sent for the IPMM service |

Note: the three above fields are only used when a new segment is created for a mobility-managed service. The fields allow defining the filter to recognise the traffic of the IPMM service in the traffic shaper.

Various modifications may be made to the embodiments described above without departing from the scope of the present invention. For example, although the embodiments have been described with respect to a WLAN in accordance with the IEEE 802.11 standard, it will be appreciated that other IEEE standards are appropriate as well as WLAN standards are appropriate as well as cellular mobile radio networks other than GSM and UMTS.

For example the mobility manger can be operable to re-allocate any bandwidth which remains after the freed bandwidth has been allocated to the applications server to provide the required increase in session bandwidth, by distributing the remaining bandwidth to each of the different traffic types in proportion with an amount of bandwidth which was lost by the traffic type when the bandwidth allocated to each traffic type was set to the guaranteed minimum.

The mobility manager can be responsive to a request from the applications server to decrease or to close a communications session level of a mobility managed mobile node, to determine an amount of bandwidth freed as a result of the decreased communications session level or the closed communications session, to allocate the freed bandwidth between the traffic types in proportion with a relative bandwidth currently being used and a predetermined priority provided to each of the different traffic types, and to adapt the traffic pattern in accordance with the allocation of the un-used bandwidth.

The traffic shaper can control the bandwidth used by the mobility-managed and non mobility-managed mobile nodes for more than one access point, each of the access points having a traffic pattern, the mobility manager being operable to adapt the traffic pattern for use by the traffic shaper in controlling the bandwidth used by the mobility-managed and non mobility-managed mobile nodes.

A computer program product has a computer readable medium having recorded thereon information signals representative of a computer program for the mobility manager.

A traffic shaping reply message provides information from the mobility manager to the traffic shaper for adapting a traffic pattern to control an amount of bandwidth used at an access point by mobile nodes which are being managed by the mobility manager and on an amount of bandwidth being used by mobile nodes which are not managed by the mobility manager for each of a plurality of traffic types.

A traffic shaping request message or a traffic shaping reply message is particularly generated at an application layer.

Various further aspects and features of the present invention are defined in the appended claims.

The invention claimed is:

1. A mobility manager for use in providing mobility management of mobile nodes which have subscribed to a communications service, a level of a communications session provided within the communications service being controlled in accordance with bandwidth allocated for the mobility-managed mobile nodes by the mobility manager from an access point to which the mobility-managed mobile nodes are attached, wherein the mobility manager is operable to receive traffic shaping report messages from a traffic shaper within an access network of which the access point forms part, the traffic shaping report messages reporting on a current use of bandwidth for each of a plurality of different traffic types by one or more non mobility-managed mobile nodes of an unregulated network, which are not controlled by the mobility manager, and reporting on bandwidth used by one or more of the mobility-managed mobile nodes of a regulated network, which are managed by the mobility manager, to adapt the traffic pattern in accordance with a current use of bandwidth for the different traffic types by the non mobility-managed mobile nodes, and to communicate the adapted traffic pattern to the traffic shaper for use in controlling the bandwidth of the access point in accordance with the adapted traffic pattern.

2. The mobility manager as claimed in claim 1, wherein the mobility manager is responsive to the traffic shaping reports providing a current bandwidth used for each of the different traffic types by the non mobility-managed mobile nodes, to identify whether there is any bandwidth of the access point which is not being used by the non mobility-managed mobile nodes for any of the traffic types, and if any of the bandwidth is not being used to allocate the un-used bandwidth between the traffic types in proportion with a relative bandwidth currently being used and a predetermined priority provided to each of the different traffic types, and to adapt the traffic pattern in accordance with the allocation of the un-used bandwidth.

3. The mobility manager as claimed in claim 2, wherein the mobility manager is operable in response to a request for an increase in a session bandwidth required by an applications server to provide an increase in a session bandwidth for a communications service provided to one of the mobility-managed mobile nodes or a newly-active mobility-managed mobile node, to allocate the required session bandwidth to the applications server for use by the mobility-managed mobile nodes or the newly-active mobility-managed mobile node in preference to the bandwidth allocated to the different traffic types for use by the non mobility-managed mobile nodes, by reducing the amount of bandwidth allocated to the different traffic types to provide freed bandwidth, and to adapt the traffic pattern to allow the reduced bandwidth allocation for the different traffic types, and the allocation of the required bandwidth to the mobility-managed mobile nodes or the newly-active mobility-managed mobile node.

4. The mobility manager as claimed in claim 3, wherein the mobility manager is operable to allocate the increased session bandwidth in preference to the bandwidth allocated to the different traffic types, by reducing the amount of bandwidth allocated to the different traffic types whilst reserving a guaranteed minimum bandwidth for each of the different traffic types.

5. The mobility manager as claimed in claim 3, wherein if the bandwidth freed by reducing an amount of bandwidth allocated to the different traffic types is less than the required increase in session bandwidth, the mobility manager is operable to determine whether the mobility-managed mobile nodes have subscribed to a higher level of service than another mobility-managed mobile node, and if it has, to decrease an amount of bandwidth allocated to a communications session for the other lower priority mobility-managed mobile node to release bandwidth which was being used in a communications session by the other lower priority mobility-managed mobile node, to provide in combination with the bandwidth acquired by reducing the bandwidth for the different traffic types used by the non-mobility managed mobile nodes and the bandwidth released from the other lower priority mobility-managed mobile node a total amount of freed bandwidth, to provide the required session bandwidth increase from the total freed bandwidth, and otherwise to refuse the request from the applications server for the required session bandwidth.

6. The mobility manager as claimed in claim 1, wherein the unregulated network is a WLAN radio access network.

7. The mobility manager as claimed in claim 6, wherein the WLAN radio access network is an IEEE 802.11 WLAN radio access network.

8. The mobility manager as claimed in claim 1, wherein the regulated network is a cellular network.

9. The mobility manager as claimed in claim 8, wherein the cellular network is one of a GSM, GPRS or UMTS cellular network.

10. A traffic shaping report message stored on a computer readable non-transitory medium providing information from a traffic shaper to a mobility manager for use in providing mobility management of mobile nodes which have subscribed to a communications service, a level of a communications session provided within the communications service being controlled in accordance with bandwidth allocated for the mobility-managed mobile nodes of a regulated network by the mobility manager from an access point to which the mobility-managed mobile nodes are attached, the traffic shaping report messages reporting on a current use of bandwidth for each of a plurality of different traffic types by one or more non mobility-managed mobile nodes of an unregulated network, which are not controlled by the mobility manager, and reporting on bandwidth used by one or more of the mobility-managed mobile nodes, which are managed by the mobility manager to adapt the traffic pattern in accordance with a current use of bandwidth for the different traffic types by the non mobility-managed mobile node, wherein the information provides an indication of an amount of bandwidth used by mobile nodes which are being managed by the mobility manager and on an amount of bandwidth being used by mobile nodes which are not managed by the mobility manager for each of a plurality of traffic types.

11. A telecommunications system, comprising an access network including one or more access points via which mobile nodes which are attached to the access point can communicate internet packets, each of the one or more access points providing an amount of available communications bandwidth, a mobility manager operable to allocate bandwidth from at least one of the access points of the access network for use by the one or more mobile nodes having subscribed to a communications service and currently affiliated with the access point, the one or more mobile nodes being mobility-managed mobile nodes of a regulated network, and a traffic shaper operable to control the use of the amount of bandwidth which is available from the access point in accordance with a traffic pattern, the traffic pattern identifying an amount of the access point bandwidth allocated to the mobility-managed mobile nodes and a bandwidth allocated to each of a plurality of traffic different types communicated via the access point for use by non mobility-managed mobile nodes of an unregulated network, wherein the mobility manager is operable in response to traffic shaping report messages, from the traffic shaper, reporting on a current use of bandwidth by the non mobility-managed mobile nodes of each of the different traffic types and the mobility-managed mobile nodes, to adapt the traffic pattern in accordance with the current use of bandwidth for the different traffic types and the mobility-managed mobile nodes, and to communicate the adapted traffic pattern to the traffic shaper, the traffic shaper being operable to control the use of the bandwidth of the access point in accordance with the adapted traffic pattern.

12. The telecommunications system as claimed in claim 11, wherein the access network includes an access gateway through which internet packets ingress and egress to and from the access network, and the traffic shaper is operable to analyse mobile node evaluation messages (MNE) providing an indication of a currently experienced link quality from an access point by a mobility-managed mobile node, together with an identification of the access point with which the mobile node is affiliated, and to identify from the mobile node evaluation messages (MNE) the access points which are currently available within the access network, and to provide the identity of each of the access points which are currently available on the access network to the access gateway, for each of which a traffic pattern should be provided.

13. A method of providing mobility management of mobile nodes which have subscribed to a communications service for providing a communications session level controlled in accordance with bandwidth allocated, to the mobility-managed mobile nodes of a regulated network, from an access point to which the mobility-managed mobile nodes are attached, the method comprising receiving traffic shaping report messages from a traffic shaper within an access network of which the access point forms part, the traffic shaping report messages reporting on a current use of bandwidth for each of a plurality of different traffic types by non mobility-managed mobile nodes of an unregulated network, which are not controlled by the mobility manager, and reporting on bandwidth used by one or more of the mobility-managed mobile nodes, which are managed by the mobility manager, adapting the traffic pattern in accordance with a current use of bandwidth for the different traffic types by the non mobility-managed mobile node, and communicating the adapted traffic pattern to the traffic shaper for use in controlling the bandwidth of the access point in accordance with the adapted traffic pattern.

14. A computer program having computer executable instructions stored on a computer readable non-transitory medium, which when loaded on to a data processor causes the data processor to perform a method of providing mobility management of mobile nodes which have subscribed to a communications service for providing a communications session level controlled in accordance with bandwidth allocated, to the mobility-managed mobile nodes of a regulated network, from an access point to which the mobility-managed mobile nodes are attached, said computer program comprising instructions for:

receiving traffic shaping report messages from a traffic shaper within an access network of which the access point forms part, the traffic shaping report messages reporting on a current use of bandwidth for each of a plurality of different traffic types by non mobility-managed mobile nodes of an unregulated network, which are not controlled by the mobility manager, and reporting on bandwidth used by one or more of the mobility-managed mobile nodes, which are managed by the mobility manager, adapting the traffic pattern in accordance with a current use of bandwidth for the different traffic types by the non mobility-managed mobile node, and communicating the adapted traffic pattern to the traffic shaper for use in controlling the bandwidth of the access point in accordance with the adapted traffic pattern.

15. A mobility manager for use in providing mobility management of mobile nodes which have subscribed to a communications service, a level of a communications session provided within the communications service being controlled in accordance with bandwidth allocated for the mobility-managed mobile nodes by the mobility manager from an access point to which the mobility-managed mobile nodes are attached, wherein the mobility manager is operable to receive traffic shaping report messages from a traffic shaper within an access network of which the access point forms part, the traffic shaping report messages reporting on a current use of bandwidth for each of a plurality of different traffic types by one or more non mobility-managed mobile nodes, which are not controlled by the mobility manager, and reporting on bandwidth used by one or more of the mobility-managed mobile nodes, which are managed by the mobility manager, to adapt the traffic pattern in accordance with a current use of bandwidth for the different traffic types by the non mobility-managed mobile nodes, and to communicate the adapted traffic pattern to the traffic shaper for use in controlling the bandwidth of the access point in accordance with the adapted traffic pattern, wherein the mobility manager is responsive to the traffic shaping reports providing a current bandwidth used for each of the different traffic types by the non mobility-managed mobile nodes, to identify whether there is any bandwidth of the access point which is not being used by the non mobility-managed mobile nodes for any of the traffic types, and if any of the bandwidth is not being used to allocate the un-used bandwidth between the traffic types in proportion with a relative bandwidth currently being used and a predetermined priority provided to each of the different traffic types, and to adapt the traffic pattern in accordance with the allocation of the un-used bandwidth.

16. A telecommunications system, comprising an access network including one or more access points via which mobile nodes which are attached to the access point can communicate internet packets, each of the one or more access points providing an amount of available communications bandwidth, a mobility manager operable to allocate bandwidth from at least one of the access points of the access network for use by the one or more mobile nodes having subscribed to a communications service and currently affiliated with the access point, the one or more mobile nodes being mobility-managed mobile nodes, and a traffic shaper operable to control the use of the amount of bandwidth which is available from the access point in accordance with a traffic pattern, the traffic pattern identifying an amount of the access point bandwidth allocated to the mobility-managed mobile node and a bandwidth allocated to each of a plurality of traffic different types communicated via the access point for use by other mobile nodes, wherein the mobility manager is operable in response to traffic shaping report messages, from the traffic shaper, reporting on a current use of bandwidth by the other mobile nodes of each of the different traffic types and the mobility-managed mobile node, to adapt the traffic pattern in accordance with the current use of bandwidth for the different traffic types and the mobility-managed mobile nodes, and to communicate the adapted traffic pattern to the traffic shaper, the traffic shaper being operable to control the use of the bandwidth of the access point in accordance with the adapted traffic pattern, wherein the access network includes an access gateway through which internet packets ingress and egress to and from the access network, and the traffic shaper is operable to analyse mobile node evaluation messages (MNE) providing an indication of a currently experienced link quality from an access point by a mobility-managed mobile node, together with an identification of the access point with which the mobile node is affiliated, and to identify from the mobile node evaluation messages (MNE) the access points which are currently available within the access network, and to provide the identity of each of the access points which are currently available on the access network to the access gateway, for each of which a traffic pattern should be provided.

\* \* \* \* \*